United States Patent
Suzuki

(10) Patent No.: US 12,287,620 B2
(45) Date of Patent: Apr. 29, 2025

(54) MACHINE LEARNING DEVICE, NUMERICAL CONTROL SYSTEM, SETTING DEVICE, NUMERICAL CONTROL DEVICE, AND MACHINE LEARNING METHOD

(71) Applicant: FANUC CORPORATION, Yamanashi (JP)

(72) Inventor: Yoshiyuki Suzuki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 354 days.

(21) Appl. No.: 17/802,420

(22) PCT Filed: Mar. 10, 2021

(86) PCT No.: PCT/JP2021/009488
§ 371 (c)(1),
(2) Date: Aug. 25, 2022

(87) PCT Pub. No.: WO2021/187268
PCT Pub. Date: Sep. 23, 2021

(65) Prior Publication Data
US 2023/0083761 A1 Mar. 16, 2023

(30) Foreign Application Priority Data
Mar. 17, 2020 (JP) .................. 2020-046070

(51) Int. Cl.
G05B 19/4155 (2006.01)
G05B 19/4065 (2006.01)

(52) U.S. Cl.
CPC ..... G05B 19/4155 (2013.01); G05B 19/4065 (2013.01); G05B 2219/37346 (2013.01);
(Continued)

(58) Field of Classification Search
CPC .................................. G05B 19/4155
(Continued)

(56) References Cited

U.S. PATENT DOCUMENTS

2017/0091667 A1* 3/2017 Yukawa ............. G06N 3/042
2018/0164756 A1* 6/2018 Yamaguchi .......... G05B 19/18
(Continued)

FOREIGN PATENT DOCUMENTS

CN 106557070 A 4/2017
JP 7-164199 6/1995
(Continued)

OTHER PUBLICATIONS

International Search Report issued Apr. 27, 2021 in corresponding International Application No. PCT/JP2021/009488.
Volodymyr Mnih et al., "Human-level control through deep reinforcement learning", URL: http://files.davidqiu.com/research/nature14236.pdf, published on Feb. 26, 2015.

*Primary Examiner* — Jigneshkumar C Patel
(74) *Attorney, Agent, or Firm* — Wenderoth, Lind & Ponack, L.L.P.

(57) ABSTRACT

A machine learning device for performing machine learning with respect to a numerical control device which causes a machine tool to operate, and is provided with: a state information acquisition unit that causes the machine tool to perform cutting work, in which a cutting amount and a cutting rate are set, and acquires state information including the cutting amount and cutting rate; an action information output unit that outputs action information; a reward calculation unit that acquires determination information that is information about the strength of pressure applied to a tool at least during cutting work, the shape of the waveform of the pressure applied to the tool, and time it has taken to perform work, and outputs a reward value in reinforcement learning; and a value function update unit that updates a
(Continued)

value function on the basis of the reward value, the state information, and the action information.

10 Claims, 10 Drawing Sheets

(52) U.S. Cl.
CPC .............. *G05B 2219/40499* (2013.01); *G05B 2219/50308* (2013.01)

(58) Field of Classification Search
USPC ........................................................ 700/160
See application file for complete search history.

(56) References Cited

U.S. PATENT DOCUMENTS

2019/0025794 A1\* 1/2019 Matsumura .......... G05B 19/404
2020/0274894 A1\* 8/2020 Argoeti ............... H04L 63/1433

FOREIGN PATENT DOCUMENTS

| JP | H07164199 A | \* | 6/1995 |
|----|----|----|----|
| JP | 2019-21235 | | 2/2019 |
| JP | 2019-188558 | | 10/2019 |
| JP | 2019-200174 | | 11/2019 |

\* cited by examiner

MACHINE LEARNING DEVICE, NUMERICAL CONTROL SYSTEM, SETTING DEVICE, NUMERICAL CONTROL DEVICE, AND MACHINE LEARNING METHOD

TECHNICAL FIELD

The present invention relates to a machine learning device, a numerical control system, a setting device, a numerical control device, and a machine learning method.

BACKGROUND ART

A cutting amount for one time and a cutting rate in a fixed cycle such as centering, tapping, boring, and turning cycles are empirically determined, based on main factors including materials and shapes of a workpiece and a tool, by an operator by repeatedly performing test machining, for example.

In that respect, such a technology is known in which a cluster created through a cluster analysis based on state variables including machining condition data, cutting condition data, machining result data, and tool data is used as a learned model, an appropriate tool is determined based on newly inputted machining conditions, cutting conditions, and machining results, and a maximum value of a cutting rate is determined within a range allowing preferable results specified in a cluster of the determined tool to be maintained. For example, see Patent Document 1.

Patent Document 1: Japanese Unexamined Patent Application, Publication No. 2019-188558

DISCLOSURE OF THE INVENTION

Problems to be Solved by the Invention

For example, in a site of multi-product, variable quantity production, such situations frequently occur that (1) a certain machining program is reused in another machine, (2) another machining program in which the form of the certain machining program is slightly modified is created to perform machining, and (3) a certain machining program is reused for a workpiece the material of which is changed to perform machining.

Under such a situation, an operator does not have sufficient time to optimize each of machining programs based on his or her experiences. Therefore, there may be cases where machining has to be performed without fully optimizing a machining program and a cutting condition. In this case, for example, to safely perform machining regardless of what changes have been made, a cutting rate may often be reduced excessively. It is thus conceivable that there may be cases where a cycle time is decreased accordingly, sacrificing the production efficiency.

To deal with such an issue, what is demanded is to optimize a machining program without increasing the operator's workload.

Means for Solving the Problems (1) A machine learning device according to an aspect of the present disclosure is a machine learning device configured to perform machine learning with respect to a numerical control device configured to cause a machine tool to operate based on a machining program, the machine learning device comprising: a state information acquisition unit configured to acquire, as the numerical control device executes the machining program set with at least a cutting amount for one time and a cutting rate and causes the machine tool to perform the cutting work, state information including the cutting amount for one time and the cutting rate; an action information output unit configured to output action information including adjustment information for the cutting amount for one time and the cutting rate included in the state information; a reward calculation unit 221 configured to acquire determination information that is information regarding at least a magnitude of pressure applied to a tool during the cutting work, a shape of a waveform of the pressure applied to the tool, and a period of time taken for the cutting work, and, based on the determination information that has been acquired, to output a reward value used in reinforcement learning depending on a predetermined condition; and a value function update unit configured to update a value function based on the reward value, the state information, and the action information.

(2) A setting device according to an aspect of the present disclosure is configured to select an action based on a threshold value that is set beforehand from among actions acquired from the machine learning device described in (1), and set the action that is selected into the machining program.

(3) A numerical control system according to an aspect of the present disclosure includes the machine learning device described in (1), the setting device described in (2), and a numerical control device configured to execute the machining program set by the setting device.

(3) A numerical control device according to an aspect of the present disclosure includes the machine learning device described in (1) and the setting device described in (2), and is configured to execute the machining program set by the setting device.

(4) A numerical control method according to an aspect of the present disclosure is a machine learning method for a machine learning device configured to perform machine learning with respect to a numerical control device configured to cause a machine tool to operate based on a machining program, the machine learning method comprising: acquiring, as the numerical control device executes the machining program set with at least a cutting amount for one time and a cutting rate and causes the machine tool to perform the cutting work, state information including the cutting amount for one time and the cutting rate; outputting action information including adjustment information for the cutting amount for one time and the cutting rate included in the state information; acquiring determination information that is information regarding at least a magnitude of pressure applied to a tool during the cutting work, a shape of a waveform of the pressure applied to the tool, and a period of time taken for the cutting work and, based on the determination information that has been acquired, outputting a reward value used in reinforcement learning depending on a predetermined condition; and updating a value function based on the reward value, the state information, and the action information.

Effects of the Invention

According to the aspects, it is possible to optimize a machining program without increasing the operator's workload.

PREFERRED MODE FOR CARRYING OUT THE INVENTION

A first embodiment of the present disclosure will now be described herein with reference to the accompanying drawings. A case will be exemplified herein, where, as a machining program, one fixed cycle such as centering or tapping is included, and learning is performed per machining program, i.e., per machining of one workpiece.

By doing so, it is possible to identify a cutting amount for one time and a cutting rate, which are set for the fixed cycle, as an action for the machining program.

First Embodiment

Figure 1:
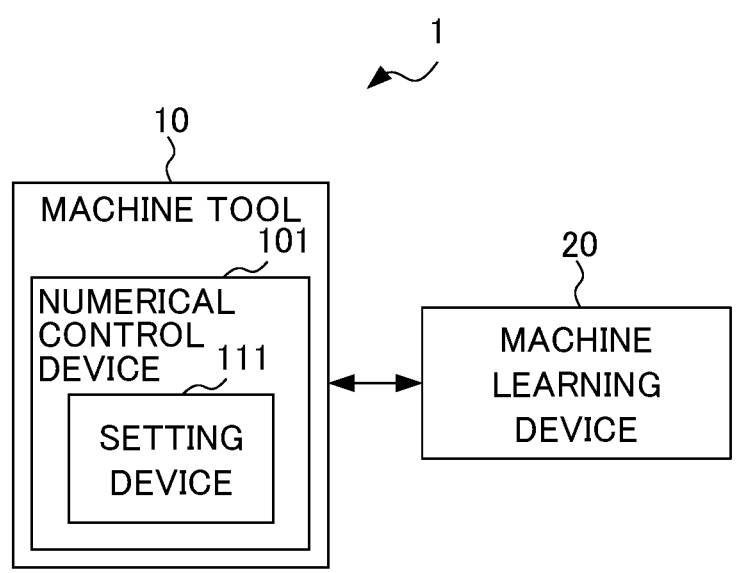
FIG. 1 is a functional block diagram illustrating a functional configuration example of a numerical control system according to a first embodiment.

FIG. 1 is a functional block diagram illustrating a functional configuration example of a numerical control system according to the first embodiment.

As illustrated in FIG. 1, a numerical control system 1 includes a machine tool 10 and a machine learning device 20.

The machine tool 10 and the machine learning device 20 may be directly coupled to each other via a coupling interface (not shown). Furthermore, the machine tool 10 and the machine learning device 20 may be coupled to each other via a network (not shown) such as a local area network (LAN) or the Internet. In this case, the machine tool 10 and the machine learning device 20 each include a communication unit (not shown) for performing intercommunications through the coupling. Note that, as will be described later, a numerical control device 101 is included in the machine tool 10, but may be a separate device from the machine tool 10. Furthermore, the numerical control device 101 may include the machine learning device 20.

The machine tool 10 is a machine tool commonly known by those skilled in the art, and includes the numerical control device 101. The machine tool 10 operates based on an operation command from the numerical control device 101.

The numerical control device 101 is a numerical control device commonly known by those skilled in the art, and includes a setting device 111. The numerical control device 101 is configured to generate an operation command based on a machining program acquired from an external device (not shown) such as devices for computer aided designing (CAD)/computer aided manufacturing (CAM), and to transmit the generated operation command to the machine tool 10. Thereby, the numerical control device 101 controls operation of the machine tool 10. While controlling operation of the machine tool 10, the numerical control device 101 may then acquire rotation numbers, motor current values, and torque of motors such as a spindle motor for a spindle (not shown) and a servo motor for a feed shaft (not shown), which are included in the machine tool 10, at a predetermined time interval such as a sampling time set beforehand from the machine tool 10.

Furthermore, the numerical control device 101 may acquire, from the machine tool 10, temperatures such as motor temperatures, a machine temperature, and an ambient temperature measured by sensors such as temperature sensors (not shown) included in the machine tool 10. Furthermore, the numerical control device 101 may acquire, from the machine tool 10, pressure in an axial direction and a rotation direction, which is applied to a tool attached to the spindle (not shown) and is measured by sensors such as pressure sensors (not shown) included in the machine tool 10. Furthermore, the numerical control device 101 may acquire a period of time taken for cutting work, which is measured by a cycle counter (not shown) included in the machine tool 10, when the machine tool 10 has performed predetermined cutting work.

Note that, since a machining program includes only one fixed cycle, in the present embodiment as described above, a period of time taken for cutting work is equal to a cycle time.

Furthermore, the numerical control device 101 may output, to the machine learning device 20 described later, for example, the material of the tool attached to the spindle (not shown) of the machine tool 10, the shape of the tool, the diameter of the tool, the length of the tool, the remaining lifetime of the tool, the material of a workpiece to be machined, and the catalog cutting conditions for the tool. Furthermore, the numerical control device 101 may output, to the machine learning device 20 described later, for example, the rotation number of the spindle, the motor current values, the machine temperature, the ambient temperature, the magnitude of pressure applied to the tool (the axial direction and the rotation direction), the shape of the waveform of the pressure applied to the tool (the axial direction and the rotation direction), the magnitude of torque applied to the feed shaft, the shape of the waveform of the torque applied to the feed shaft, the magnitude of torque applied to the spindle, the shape of the waveform of the torque applied to the spindle, and the period of time taken for cutting work, which are acquired from the machine tool 10.

Note that the numerical control device 101 may store, for example, in a storage unit (not shown) such as a hard disk drive (HDD) included in the numerical control device 101, a tool management table (not shown) for managing all tools attached to the spindle (not shown) of the machine tool 10. The numerical control device 101 may then acquire, based on a tool number that is set in the machining program, for example, the material of the tool, the shape of the tool, the diameter of the tool, the length of the tool, and the remaining lifetime of the tool from the tool management table (not shown). Note herein that, for example, the remaining lifetime of the tool may be acquired from the service lifetime of the tool available from a correspondence table described in a catalog and from the machining time per workpiece. The remaining lifetime of the tool in the tool management table (not shown) may then be updated with the acquired value.

Furthermore, the numerical control device 101 may acquire, for example, the material of the workpiece to be machined and the catalog cutting conditions for the tool through input operations of an operator via an input device (not shown) such as a keyboard and a touch panel included in the numerical control device 101.

Furthermore, the shape of the waveform of the pressure applied to the tool represents time-series data pertaining to the pressure applied to the tool. Furthermore, the shape of the waveform of the torque applied to the feed shaft represents time-series data pertaining to the torque applied to the feed shaft. Furthermore, the shape of the waveform of the torque applied to the spindle represents time-series data pertaining to the torque applied to the spindle.

The setting device 111 is configured to select an action based on a threshold value that is set beforehand from among actions acquired from the machine learning device 20 described later, and to set the selected action into the machining program.

Specifically, the setting device 111 compares, for example, the remaining tool lifetime of the tool being used in the machine tool 10 with a threshold value that is set beforehand (e.g., 10%), selects an action that prioritizes machining time when the remaining lifetime of the tool is greater than the threshold value, and selects an action that prioritizes the lifetime of the tool when the remaining lifetime of the tool is equal to or below the threshold value. The setting device 111 sets the selected action into the machining program.

Note that it is possible to configure the setting device 111 with a computer such as the numerical control device 101 equipped with an arithmetic processing device such as a central processing unit (CPU). Furthermore, the setting device 111 may be a separate device from the numerical control device 101.

<Machine Learning Device 20>

The machine learning device 20 is a device configured to perform, as the numerical control device 101 executes the machining program to cause the machine tool 10 to operate, reinforcement learning of a cutting amount for one time and a cutting rate per workpiece.

Prior to describing functional blocks included in the machine learning device 20, the basic mechanism of Q-learning exemplified as the reinforcement learning will now first be described herein. However, the reinforcement learning is not limited to the Q-learning. An agent (corresponding to the machine learning device 20 in the present embodiment) observes the state of the environment (corresponding to the machine tool 10 and the numerical control device 101 in the present embodiment) and selects a certain action. The environment changes based on the selected action. As the environment changes, a certain reward is provided, allowing the agent to perform learning based on the provided reward to select a better action.

In contrast to supervised learning that indicates a perfect and correct answer, a reward used in the reinforcement learning represents in many cases a fragmentary value based on a partial change in an environment. Therefore, the agent performs learning to maximize a total of rewards to be acquired in the future.

As described above, by performing learning of actions through the reinforcement learning, a method of learning an appropriate action based on interactions of actions to an environment is learnt, i.e., a method of learning how to maximize rewards to be acquired in the future. This means that it is possible to acquire actions that leave effects in the future, i.e., in the present embodiment, for example, a fixed cycle of a machining program is optimized in a site of multi-product, variable quantity production without increasing the operator's workload.

Note herein that it is possible to use a desired learning method as the reinforcement learning. However, in the below description, described is an example case where the Q-learning representing a method of learning a value function Q(s, a) that selects an action a under a state s of a certain environment is used.

The Q-learning aims to select, under a certain state s, an action a according to which the value of the value function Q(s, a) becomes highest as an optimum action from among actions a that are possible to take.

However, for a combination of a state s and an action a, a correct value of the value function Q(s, a) is not known at all at a point in time when starting the Q-learning for the first time. Then, the agent selects an action a that varies under a certain state s to select a better action based on a reward provided to the action a at that time to learn the correct value function Q(s, a).

Furthermore, since the purpose is to maximize a total of rewards to be acquired in the future, what is aimed is to finally satisfy an equation of $Q(s, a) = E[\Sigma(\gamma^t) r_t]$. Where $E[\ ]$ represents an expected value, t represents time, $\gamma$ represents a parameter called discount rate described later, $r_t$ represents a reward at the time t, and $\Sigma$ represents a total at the time t. The expected value in this equation is an expected value when a state changes in accordance with an optimum action. However, since it is unknown that which is an optimum action in the course of the Q-learning, various actions are performed to search for an optimum action while performing the reinforcement learning. It is possible to represent an updating expression for the value function Q(s, a) as described above with Expression 1 described below, for example.

[Expression 1]
$$Q(s_{t+1}, a_{t+1}) \leftarrow Q(s_t, a_t) + \alpha\left(r_{t+1} + \gamma \max_a Q(s_{t+1}, a) - Q(s_t, a_t)\right)$$

In Expression 1 described above, $s_t$ represents the state of an environment at a time t, and $a_t$ represents an action at the time t. With the action $a_t$, the state changes to $s_{t+1}$. A reward to be acquired when the state changes is represented by $r_{t+1}$. Furthermore, the item attached with max represents one acquired by multiplying a Q value by $\gamma$ when selecting an action a according to which the Q value becomes highest, which is known at that time under the state $s_{t+1}$. Note herein that $\gamma$ represents a parameter satisfying $0<\gamma\leq 1$, and is called as a discount rate. Furthermore, a represents a learning coefficient falling within a range of $0<\alpha\leq 1$.

Expression 1 described above represents a method of updating a value function $Q(s_t, a_t)$ for the action $a_t$ under the state $s_t$ based on the reward $r_{t+1}$ returned as a result of the attempt $a_t$. The updating expression indicates that, when a value $\max_a Q(s_{t+1}, a)$ according to the best action under the next state $s_{t+1}$ due to the action $a_t$ is greater than the value function $Q(s_t, a_t)$ according to the action at under the state $s_t$, $Q(s_t, a_t)$ is increased, while, when the value $\max_a Q(s_t, a)$ is smaller than the value function $Q(s_t, a_t)$, $Q(s_t, a_t)$ is decreased. That is, the value of a certain action under a certain state is made approach to the value of the best action in subsequent state depending on this. However, this difference changes depending on the ideal states for the discount rate $\gamma$ and reward $r_{t+1}$; however, basically, it becomes a mechanisms in which the quality for the best action in a certain state propagates to the quality of the action one previous state leading to this.

Note herein that, in the Q-learning, there is a method of performing learning by creating a table of Q(s, a) for all pairs (s, a) of state and action. However, since there are excessive states in number when acquiring all values of Q(s, a) pertaining to pairs of state and action, it may take more time that the Q-learning requires to converge.

Then, it may utilize a technology called Deep Q-Network (DQN) that is commonly known. Specifically, the value function Q may be constructed by using an appropriate neural network, parameters for the neural network may be adjusted, and the value function Q may be approximated with the appropriate neural network to calculate a value of the value function Q(s, a). By utilizing the DQN, it is possible to shorten the time that the Q-learning requires to converge. Note that, for the DQN, for example, Non-Patent Document described below has provided detailed description.

Non-Patent Document

"Human-level control through deep reinforcement learning", written by Volodymyr Mnih [online], [retrieved on 17 Jan., 2017], Internet <URL: http://files.davidqiu.com/research/nature14236.pdf>.

The Q-learning described above is performed by the machine learning device 20. Specifically, the machine learning device 20 uses, as a state s, information pertaining to the tool and the workpiece set in the machine tool 10, a cutting amount for one time and a cutting rate, which are set for a fixed cycle, and measured values acquired from the machine tool 10 by executing the machining program, and performs learning of a value Q selecting, as an action a for the state s, settings and changes in the cutting amount for one time and the cutting rate, which are set for the fixed cycle pertaining to the state s. For example, the material of the tool, the shape of the tool, the diameter of the tool, the length of the tool, the remaining lifetime of the tool, the material of the workpiece to be machined, and the catalog cutting conditions for the tool are exemplified herein as the information pertaining to the tool and the workpiece. Furthermore, for example, the rotation number of the spindle, the motor current values, the machine temperature, and the ambient temperature are exemplified as the measured values acquired from the machine tool 10.

The machine learning device 20 observes state information (state data) s including the information pertaining to the tool and the workpiece set in the machine tool 10, the cutting amount for one time and the cutting rate, which are set for the fixed cycle, and the measured values acquired from the machine tool 10 by executing the machining program to determine an action a. Each time the action a is performed, the machine learning device 20 receives a reward. The machine learning device 20 searches in a trial-and-error manner for an optimum action a to maximize a total of rewards to be acquired in the future. By doing so, the machine learning device 20 makes it possible to select an optimum action a (i.e., "cutting amount for one time" and "cutting rate") with respect to a state s including information pertaining to the tool and the workpiece set in the machine tool 10, a cutting amount for one time and a cutting rate, which are set for a fixed cycle, and measured values acquired from the machine tool 10 by executing the machining program.

Figure 2:
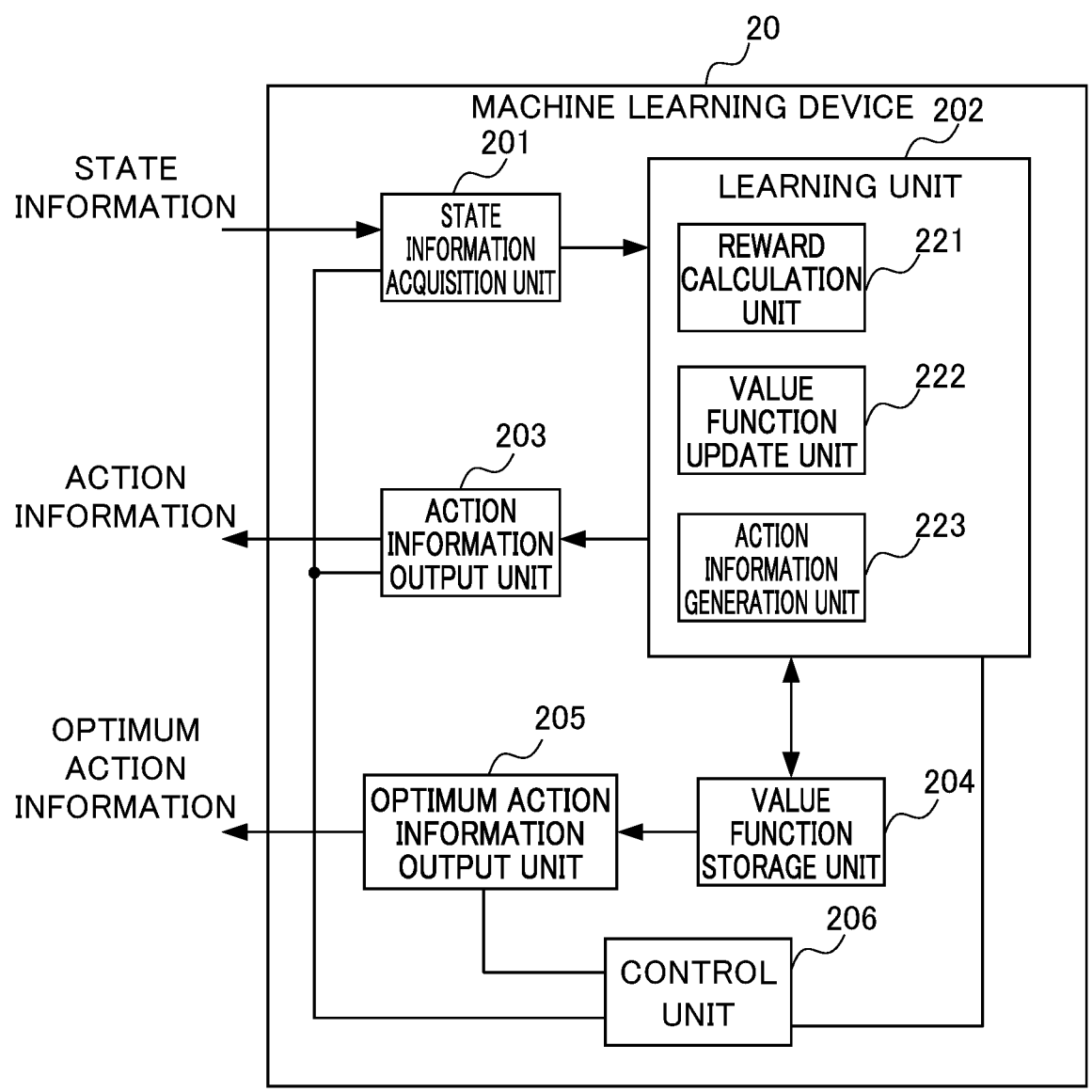
FIG. 2 is a functional block diagram illustrating a functional configuration example of a machine learning device.

FIG. 2 is a functional block diagram illustrating a functional configuration example of the machine learning device 20. To perform the reinforcement learning described above, the machine learning device 20 includes, as illustrated in FIG. 2, a state information acquisition unit 201, a learning unit 202, an action information output unit 203, a value function storage unit 204, an optimum action information output unit 205, and a control unit 206. The learning unit 202 includes a reward calculation unit 221, a value function update unit 222, and an action information generation unit 223. The control unit 206 is configured to control operation of the state information acquisition unit 201, the learning unit 202, the action information output unit 203, and the optimum action information output unit 205.

The state information acquisition unit 201 is configured to acquire, as a state of the machine tool 10, state data s including information pertaining to a tool and a workpiece set in the machine tool 10, a cutting amount for one time and a cutting rate, which are set for a fixed cycle, and measured values acquired from the machine tool 10 by executing a machining program, from the numerical control device 101. The state data s corresponds to an environment state s for the Q-learning.

The state information acquisition unit 201 outputs the acquired state data s to the learning unit 202.

Note that the state information acquisition unit 201 may store the acquired state data s in a storage unit (not shown) included in the machine learning device 20. In this case, the learning unit 202 described later may read the state data s from the storage unit (not shown) of the machine learning device 20.

Furthermore, the state information acquisition unit 201 further acquires determination information used to calculate a reward for performing the Q-learning. Specifically, the magnitude of pressure applied to the tool (the axial direction and the rotation direction), the shape of a waveform of the pressure applied to the tool (the axial direction and the rotation direction), the magnitude of torque applied to the feed shaft, the shape of a waveform of the torque applied to the feed shaft, the magnitude of torque applied to the spindle, the shape of a waveform of the torque applied to the spindle, and the period of time taken for the cutting work when the machining program is executed, which are acquired from the machine tool 10 by executing the machining program pertaining to the state information s, are regarded as the determination information used to calculate a reward for performing the Q-learning.

The learning unit 202 is a part that performs learning of the value function Q(s, a) when a certain action a is selected under certain state data (environment state) s. Specifically, the learning unit 202 includes the reward calculation unit 221, the value function update unit 222, and the action information generation unit 223.

Note that the learning unit 202 is configured to determine whether learning should be continued. It is possible to determine whether learning should be continued based on, for example, whether an attempt count after starting the machine learning has reached the maximum attempt count or whether an elapsed period of time after starting the machine learning has exceeded (or, is equal to or greater than) a predetermined period of time.

The reward calculation unit 221 is configured to calculate a reward when an action a is selected under a certain state s based on the determination information. A reward may be calculated based on a plurality of evaluation items included in the determination information. In the present embodiment, a reward is calculated based on, for example, items of (1) magnitude of pressure (torque) applied to tool, feed shaft, and spindle, (2) shapes of waveforms of pressure (torque) applied to tool, feed shaft, and spindle, and (3) period of time taken for cutting work.

Then, how to calculate a reward for the item of (1) magnitude of pressure (torque) applied to tool, feed shaft, and spindle, the item of (2) shapes of waveforms of pressure (torque) applied to tool, feed shaft, and spindle, and the item of (3) period of time taken for cutting work will now be described below.

For a Reward for the Item of (1) Magnitude of Pressure (Torque) Applied to Tool, Feed Shaft, and Spindle The values of the magnitude of pressure (torque) applied to the tool, the feed shaft, and the spindle under a state s and a state s' when the state s has transitioned to the state s' due to an action a are respectively represented as values $P_t(s)$, $P_f(s)$, and $P_m(s)$, and values $P_t(s')$, $P_f(s')$, and $P_m(s')$.

The reward calculation unit 221 calculates a reward based on the magnitude of the pressure (torque) applied to the tool, the feed shaft, and the spindle, as described below.

When the value $P_t(s')$<the value $P_t(s)$, the value $P_f(s')$<the value $P_f(s)$, and the value $P_m(s')$<the value $P_m(s)$, a reward $r_p$ is set to a positive value.

When at least one of the values $P_t(s')$, $P_f(s')$, and $P_m(s')$ under the state s' is greater than corresponding one of the values $P_t(s)$, $P_f(s)$, and $P_m(s)$ under the state s, the reward $r_p$ is set to a negative value.

Note that the negative value and the positive value may be constant values set beforehand (e.g., a first negative value and a first positive value), for example.

For a Reward for the Item of (2) Shapes of Waveforms of Pressure (Torque) Applied to Tool, Feed Shaft, and Spindle The shapes of waveforms of pressure (torque) applied to the tool, the feed shaft, and the spindle under the state s' when the state s has transitioned to the state s' due to the action a are respectively represented as $WF_t(s')$, $WF_f(s')$, and $WF_m(s')$.

The reward calculation unit 221 calculates a reward based on the shapes of the waveforms of the pressure (torque) applied to the tool, the feed shaft, and the spindle, as described below.

When at least one of $WF_t(s')$, $WF_f(s')$, and $WF_m(s')$ respectively representing the shapes of the waveforms of the pressure (torque) applied to the tool, the feed shaft, and the spindle is similar to a waveform indicating a sign that the tool will break down or a waveform indicating a sharper decrease in the lifetime of the tool, a reward $r_w$ is set to a negative value.

When $WF_t(s')$, $WF_f(s')$, and $WF_m(s')$ respectively representing the shapes of the waveforms of the pressure (torque) applied to the tool, the feed shaft, and the spindle are all dissimilar to the waveform indicating a sign that the tool will break down and the waveform indicating a sharper decrease in the lifetime of the tool, the reward $r_w$ is set to a positive value.

Note that data pertaining to the waveform indicating a sign that the tool will break down and the waveform indicating a sharper decrease in the lifetime of the tool may be acquired beforehand for each tool, and stored in the storage unit (not shown) of the machine learning device 20.

Furthermore, the negative value and the positive value may be constant values set beforehand (e.g., a second negative value and a second positive value), for example.

For a Reward for (3) Period of Time Taken for Cutting Work

The values of the periods of time taken for cutting work under the state s and the state s' when the state s has transitioned to state s' due to the action a are respectively represented as a value $T(s)$ and a value $T(s')$.

The reward calculation unit 221 calculates a reward based on the periods of time taken for the cutting work, as described below.

When the value $T(s')$>the value $T(s)$, a reward $r_c$ is set to a negative value.

When the value $T(s')$=the value $T(s)$, the reward $r_c$ is set to zero.

When the value $T(s')$<the value $T(s)$, the reward $r_c$ is set to a positive value.

Note that the negative value and the positive value may be constant values set beforehand (e.g., a third negative value and a third positive value), for example.

The reward calculation unit 221 may use Equation 2 to separately perform weighting addition on the rewards $r_p$, $r_w$, and $r_c$ each calculated per each of the items described above, per machine learning prioritizing a period of time required for machining and machine learning prioritizing the lifetime of the tool to calculate respective rewards r, as rewards in the machine learning prioritizing a period of time required for machining and the machine learning prioritizing the lifetime of the tool.

$$r = a_w \cdot r_p + b_w \cdot r_w + c_w \cdot r_c \quad \text{[Equation 2]}$$

Note that coefficients $a_w$, $b_w$, and $c_w$ represent weight coefficients.

Furthermore, the reward calculation unit 221 may set, in calculating a reward r (hereinafter also referred to as a "reward $r_{cycle}$") to be used during the machine learning prioritizing a period of time required for machining, for example, a value of the coefficient $c_w$ in Equation 2 to a greater value, and absolute values of the third negative value and the third positive value to greater values, compared with those to be used during the machine learning prioritizing the lifetime of the tool.

Furthermore, the reward calculation unit 221 may set, in calculating a reward r (hereinafter also referred to as a "reward $r_{tool}$") to be used during the machine learning prioritizing the lifetime of the tool, for example, a value of the coefficient $b_w$ in Equation 2 to a greater value, and absolute values of the second negative value and the second positive value to greater values, compared with those to be used during the machine learning prioritizing a period of time required for machining.

The machine learning prioritizing a period of time required for machining will be hereinafter also referred to as "machine learning in machining time priority mode", unless otherwise stated. Furthermore, the machine learning prioritizing the lifetime of the tool will be hereinafter also referred to as "machine learning in tool lifetime priority mode", unless otherwise stated.

The value function update unit 222 is configured to perform, in the case of the machine learning in the machining time priority mode, the Q-learning in the machining time priority mode based on the state s, the action a, the state s' when the action a is applied to the state s, and the value of the reward $r_{cycle}$ calculated as described above to update the value function $Q_{cycle}$ that the value function storage unit 204 stores. The value function update unit 222 is further configured to perform, in the case of the machine learning in the tool lifetime priority mode, the Q-learning in the tool lifetime priority mode based on the state s, the action a, the state s' when the action a is applied to the state s, and the value of the reward $r_{tool}$ calculated as described above to update the value function $Q_{tool}$ that the value function storage unit 204 stores.

For updating the value function $Q_{cycle}$ in the machining time priority mode and the value function $Q_{tool}$ in the tool lifetime priority mode, online learning, batch learning, or mini-batch learning may be performed.

The online learning refers to a learning method under which a certain action a is applied to the present state s to immediately update the value function Q each time the state s has transitioned to a new state s'. Furthermore, the batch learning refers to a learning method under which a certain action a is applied to the present state s and the state s is allowed to repeatedly transition to a new state s' to collect data used for learning, use all pieces of collected data used for learning, and update the value function Q. Furthermore, the mini-batch learning serves as intermediate learning between the online learning and the batch learning, and refers to a learning method under which, each time data used for learning is cumulated to a certain level, the value function Q is updated.

The action information generation unit 223 is configured to select, for the present state s, an action a in the course of the Q-learning. The action information generation unit 223 generates action information a to cause operation of modifying a cutting amount for one time and a cutting rate, which are set for a fixed cycle (corresponding to an action a in the Q-learning), to be performed, in the course of the Q-learning in accordance with the machining time priority mode or the tool lifetime priority mode, and outputs the generated action information a to the action information output unit 203.

More specifically, the action information generation unit 223 may increase or decrease in an incremental manner a cutting amount for one time and a cutting rate, which are included in an action a, for a cutting amount for one time and a cutting rate, which are set for a fixed cycle, and which are included in a state s, per each of the machining time priority mode and the tool lifetime priority mode.

In the present embodiment, for example, a case where the machine learning in the machining time priority mode and the machine learning in the tool lifetime priority mode are alternately performed is described. Note that, to prevent the machine learning from being biased to either mode in this case, a commonly known method such as greedy algorithm and E-greedy algorithm, described later, may be used at random to perform the machine learning. Furthermore, as will be described later, the machine learning in the machining time priority mode and the machine learning in the tool lifetime priority mode may be separately performed.

The action information generation unit 223 may use the machine learning in the machining time priority mode or the tool lifetime priority mode to adjust, with an action a, a cutting amount for one time and a cutting rate for a machining program, and, when there is a transition to a state s', may select a cutting amount for one time and a cutting rate for the machining program for an action a' with respect to the state s' in accordance with the state of forces (torque) applied to the tool, the feed shaft, and the spindle (whether they decrease), the state of the shapes of waveforms of the forces (torque) applied to the tool, the feed shaft, and the spindle (whether there is similarity), and the state of a machining time (whether it increases or decreases, or stays constant).

For example, for the machine learning in the machining time priority mode, when a cutting amount for one time and/or a cutting rate increase(s), the reward $r_{cycle}$ thus increases, all forces (torque) applied to the tool, the feed shaft, and the spindle decrease, there is dissimilarity in all the shapes of waveforms of the forces (torque) applied to the tool, the feed shaft, and the spindle, and the period of time required for machining decreases, such a measure may be taken that selects, as an action a' with respect to a state s', for example, an action a' allowing the period of time required for machining to be shortened such as one in which the cutting amount for one time and/or the cutting rate are or is increased in an incremental manner.

Otherwise, for the machine learning in the machining time priority mode, when a cutting amount for one time and/or a cutting rate increase(s), and the reward $r_{cycle}$ thus decreases, such a measure may be taken that selects, as an action a' with respect to a state s', for example, an action a' allowing the period of time required for machining to be shortened such as one in which a cutting amount for one time and/or a cutting rate are or is returned to previous one(s).

Furthermore, for the machine learning in the tool lifetime priority mode, when a cutting amount for one time and/or a cutting rate decrease(s), the reward $r_{tool}$ thus increases, all forces (torque) applied to the tool, the feed shaft, and the spindle decrease, there is dissimilarity in all the shapes of waveforms of the forces (torque) applied to the tool, the feed shaft, and the spindle, and the period of time required for machining increases or decreases or stays constant, such a measure may be taken that selects, as an action a' with respect to a state s', for example, an action a' suppressing a decrease in the lifetime of the tool such as one in which the cutting amount for one time and/or the cutting rate are or is decreased in an incremental manner.

Otherwise, for the machine learning in the tool lifetime priority mode, when a cutting amount for one time and/or a cutting rate decrease(s), the reward $r_{tool}$ thus decreases, such a measure may be taken that selects, as an action a' with respect to a state s', for example, an action a' suppressing a decrease in the lifetime of the tool such as one in which the cutting amount and/or the cutting rate are or is returned to previous one(s).

Furthermore, the action information generation unit 223 may configure so as to adopt a plan that selects the action a' by a well-known method such as a greedy method of selecting the action a' having the highest quality Q(s,a) among the qualities of existing actions a estimated, or an ε-greedy method of randomly selecting the action a' with a small probability ε, and selecting the action a' having the highest quality Q(s,a) other than this.

The action information output unit 203 is configured to output action information a outputted from the learning unit 202 to the numerical control device 101. The action information output unit 203 may output, as action information, for example, updated values of a cutting amount for one time and a cutting rate to the numerical control device 101. Thereby, the numerical control device 101 updates the cutting amount for one time and the cutting rate, which are set for the fixed cycle, based on the received, updated values of the cutting amount for one time and the cutting rate. The numerical control device 101 then generates an operation command based on the updated cutting amount for one time and the updated cutting rate, which are set for the fixed cycle, and causes the machine tool 10 to perform the cutting work based on the generated operation command.

Note that the action information output unit 203 may output, as action information, a machining program updated based on the updated values of the cutting amount for one time and the cutting rate to the numerical control device 101.

The value function storage unit 204 is a storage device configured to store the value function $Q_{cycle}$ in the machining time priority mode and the value function $Q_{tool}$ in the tool lifetime priority mode. The value functions $Q_{cycle}$, $Q_{tool}$ may be each stored as a table (hereinafter also referred to as an "action value table") per state s or action a, for example. The value functions $Q_{cycle}$, $Q_{tool}$ stored in the value function storage unit 204 are updated by the value function update unit 222.

The optimum action information output unit 205 is configured to generate, based on the value function $Q_{cycle}$ or the value function $Q_{tool}$, which is updated as the value function update unit 222 performs the Q-learning, action information a (hereinafter also referred to as "optimum action information") causing the numerical control device 101 to perform operation according to which a value of a value function becomes maximum.

More specifically, the optimum action information output unit 205 acquires the value function $Q_{cycle}$ in the machining time priority mode and the value function $Q_{tool}$ in the tool lifetime priority mode, which the value function storage unit 204 stores. The value functions $Q_{cycle}$, $Q_{tool}$ are those that are updated as the value function update unit 222 performs the Q-learning, as described above. The optimum action information output unit 205 then generates action information based on the acquired value function $Q_{cycle}$ in the machining time priority mode and action information based on the acquired value function $Q_{tool}$ in the machining time priority mode, and outputs the generated pieces of action information to the numerical control device 101. The optimum action information includes, similar to the action information that the action information output unit 203 outputs in the course of the Q-learning, information indicative of updated values of a cutting amount for one time and a cutting rate.

The functional blocks included in the machine learning device 20 have been described above.

To achieve the functional blocks, the machine learning device 20 includes an arithmetic processing device such as a central processing unit (CPU). The machine learning device 20 further includes an auxiliary storage device such as a hard disk drive (HDD) that stores programs for various types of control, including application software and an operating system (OS), and a main storage device such as a random access memory (RAM) that stores data that the arithmetic processing device temporarily requires to execute the programs.

In the machine learning device 20, the arithmetic processing device then reads the application software and the OS from the auxiliary storage device, deploys the read application software and the read OS into the main storage device, and performs arithmetic processing based on the application software and the OS. Based on a result of the arithmetic processing, various types of hardware included in the machine learning device 20 are further controlled. Therefore, the functional blocks according to the present embodiment are achieved. That is, it is possible to achieve the present embodiment when the hardware and the software cooperate with each other.

Since the machine learning device 20 is expected to perform a greater amount of arithmetic processing along with machine learning, for example, a graphics processing unit (GPU) may be mounted on a personal computer, and a technology called general-purpose computing on graphics processing units (GPGPU) may be used to utilize the GPU in arithmetic processing along with the machine learning, since this allows to achieve prompt processing. Furthermore, to perform more prompt processing, a plurality of computers each mounted with such a GPU as described above may be used to build a computer cluster to allow the plurality of computers included in the computer cluster to perform parallel processing.

Next, operation of the machine learning device 20 when performing the Q-learning, according to the present embodiment, will now be described herein with reference to the flowchart in FIG. 3.

Figure 3:
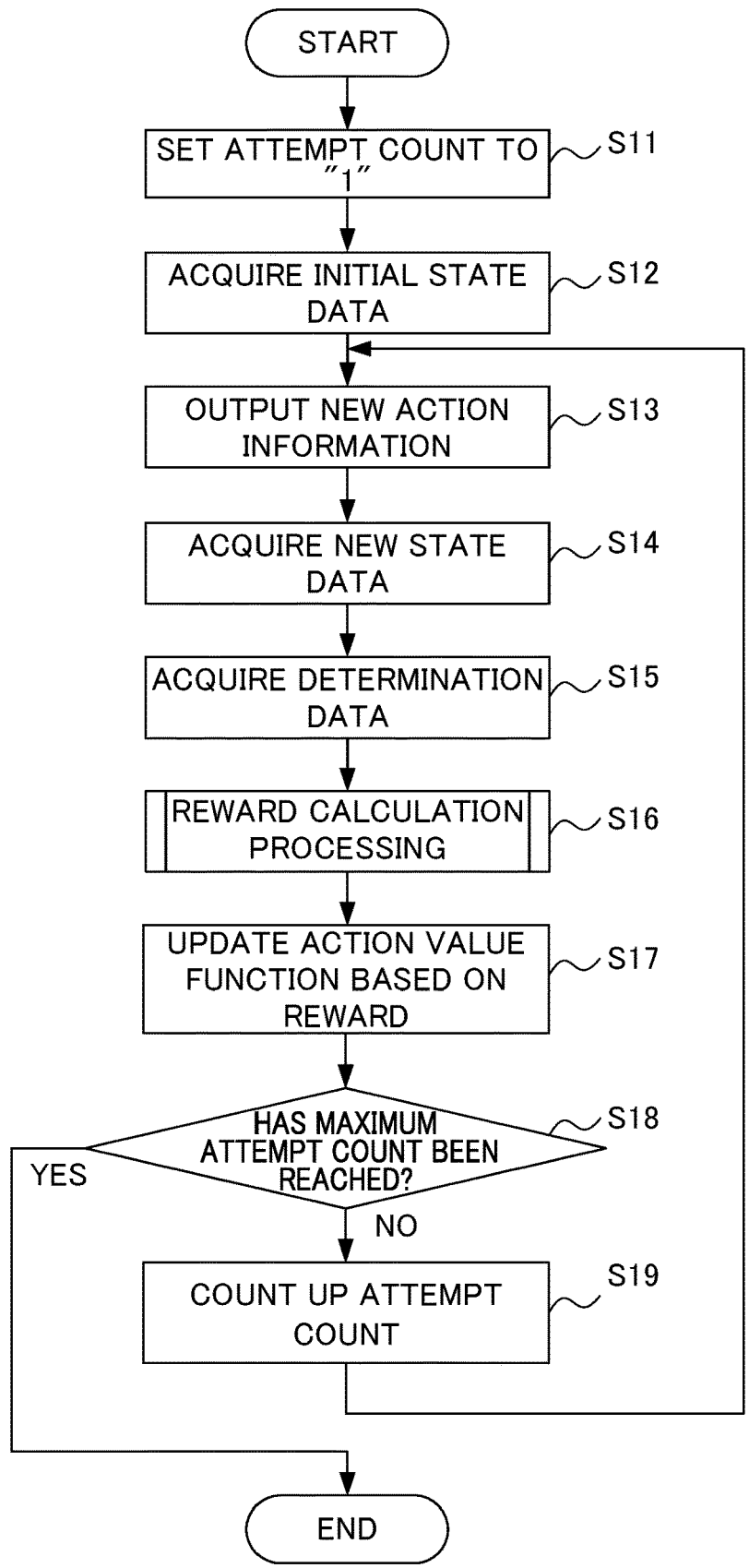
FIG. 3 is a flowchart illustrating operation of the machine learning device when performing Q-learning, according to the first embodiment.

FIG. 3 is a flowchart illustrating the operation of the machine learning device 20 when performing the Q-learning, according to the first embodiment.

At Step S11, the control unit 206 instructs the state information acquisition unit 201 to acquire state information indicative of an attempt count set to initial setting, i.e., "1".

At Step S12, the state information acquisition unit 201 acquires initial state data from the numerical control device 101. The acquired state data is outputted to the action information generation unit 223. As described above, the state data (state information) is information corresponding to a state s in the Q-learning, and includes, at the point in time at Step S12, a cutting amount for one time, a cutting rate, the material of a tool, the shape of the tool, the diameter of the tool, the length of the tool, the remaining lifetime of the tool, the material of a workpiece to be machined, the catalog cutting conditions for the tool, the rotation number of the spindle, motor current values, a machine temperature, and an ambient temperature. Note that the operator generates beforehand state data at a point in time of starting the Q-learning for the first time.

At Step S13, the action information generation unit 223 generates, through the machine learning in the machining time priority mode or the tool lifetime priority mode, pieces of new action information a in the machining time priority mode and the tool lifetime priority mode, and outputs the generated pieces of new action information a in the machining time priority mode and the tool lifetime priority mode to the numerical control device 101 via the action information output unit 203. The numerical control device 101 executes, based on the action information a selected by the setting device 111 from among the received pieces of action information a in the machining time priority mode and the tool lifetime priority mode, a machining program in which a cutting amount for one time and a cutting rate, which are set for a fixed cycle, are updated. The numerical control device 101 generates an operation command based on the updated machining program, and causes the machine tool 10 to perform cutting work based on the generated operation command.

At Step S14, the state information acquisition unit 201 acquires state data corresponding to a new state s' from the numerical control device 101. Note herein that the new state data includes a cutting amount for one time, a cutting rate, the material of the tool, the shape of the tool, the diameter of the tool, the length of the tool, the remaining lifetime of the tool, the material of the workpiece to be machined, the catalog cutting conditions for the tool, the rotation number of the spindle, motor current values, a machine temperature, and an ambient temperature. The state information acquisition unit 201 outputs the acquired state data to the learning unit 202.

At Step S15, the state information acquisition unit 201 acquires determination information about the new state s'. Note herein that the determination information includes the magnitude of pressure applied to the tool (the axial direction and the rotation direction), the shape of a waveform of the pressure applied to the tool (the axial direction and the rotation direction), the magnitude of torque applied to the feed shaft, the shape of a waveform of the torque applied to the feed shaft, the magnitude of torque applied to the spindle, the shape of a waveform of the torque applied to the spindle, and the period of time taken for the cutting work when the updated machining program is executed, which are acquired from the machine tool 10 as the updated machining program is executed at Step S13. The acquired determination information is outputted to the learning unit 202.

At Step S16, the reward calculation unit 221 performs reward calculation processing based on the acquired determination information, and calculates a reward $r_{cycle}$ in the machining time priority mode and a reward $r_{tool}$ in the tool lifetime priority mode, respectively. Note that a detailed flow of the reward calculation processing will be described later.

At Step S17, the value function update unit 222 updates the value function $Q_{cycle}$ and the value function $Q_{tool}$ that the value function storage unit 204 stores, respectively, based on the calculated reward $r_{cycle}$ and the calculated reward $r_{tool}$.

At Step S18, the control unit 206 determines whether an attempt count after starting the machine learning has reached the maximum attempt count. The maximum attempt count should be set beforehand. When the maximum attempt count has not yet been reached, the attempt count is counted up at Step S19. Then the processing returns to Step S13. The processing from Steps S13 to S19 is repeatedly performed until the maximum attempt count has been reached.

Note that, although, in the flow in FIG. 3, the processing ends when the attempt count reaches the maximum attempt count, the processing may end when such a condition pertaining to a period of time taken for the processing from Steps S13 to S19 is satisfied that a cumulative period of time after starting the machine learning exceeds (or, is equal to or greater than) a maximum elapsed period of time set beforehand.

Furthermore, although Step S17 has exemplified online updating, the updating method may be replaced with batch updating or mini-batch updating, instead of the online updating.

Figure 4:
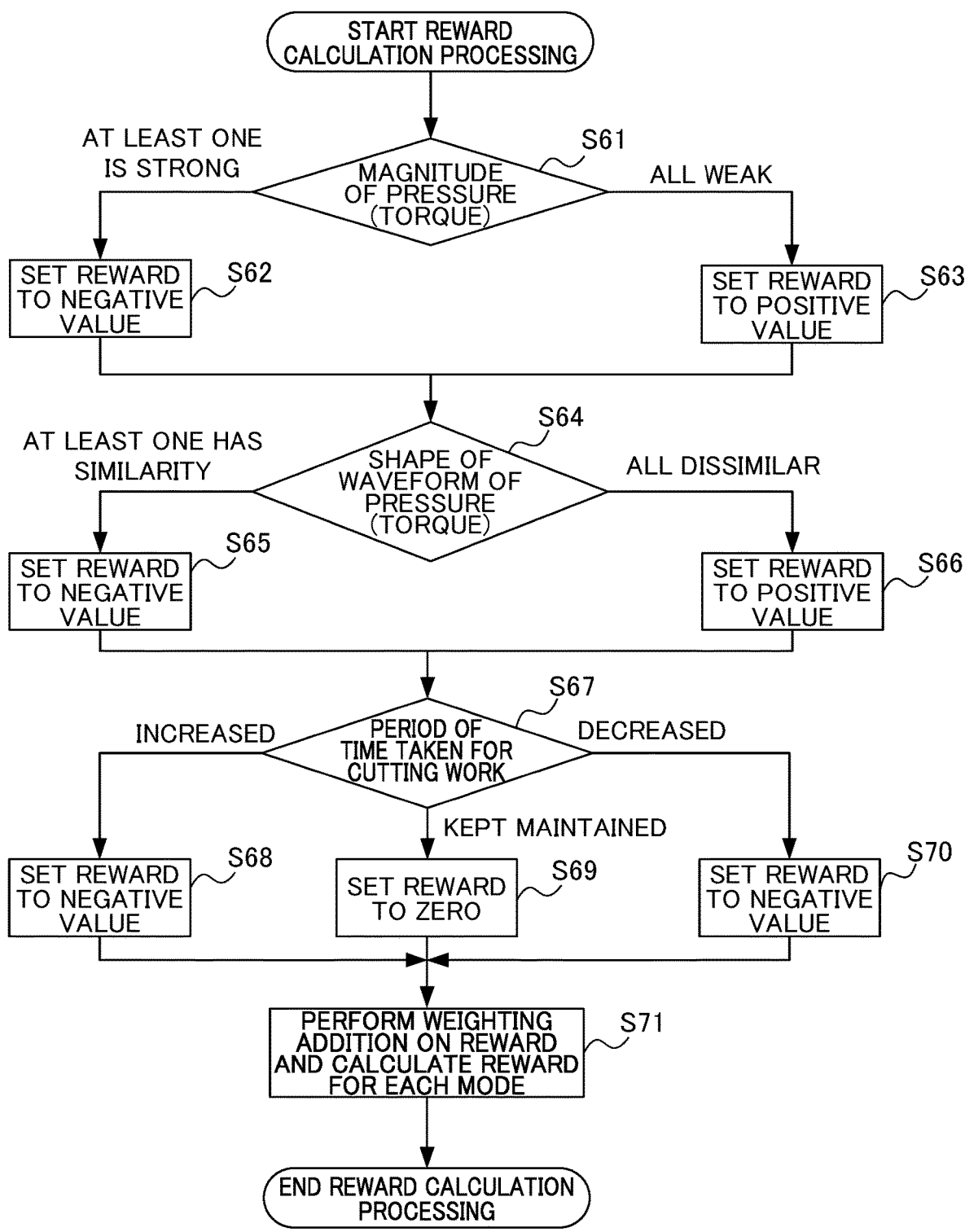
FIG. 4 is a flowchart illustrating detailed processing contents of reward calculation processing illustrated at Step S16 in FIG. 3.

FIG. 4 is a flowchart illustrating detailed processing contents of the reward calculation processing illustrated at Step S16 in FIG. 3.

At Step S61, the reward calculation unit 221 determines whether all the values $P_t(s')$, $P_f(s')$, and $P_m(s')$ of the magnitude of pressure (torque) applied to the tool, the feed shaft, and the spindle, which are included in the determination information pertaining to the state s', are respectively smaller, i.e., weaker, than the values $P_t(s)$, $P_f(s)$, and $P_m(s)$ of the magnitude of pressure (torque) applied to the tool, the feed shaft, and the spindle, which are included in the determination information pertaining to the state s. When all the values $P_t(s')$, $P_f(s')$, and $P_m(s')$ of the magnitude of the pressure (torque) applied to the tool, the feed shaft, and the spindle, which pertain to the state s', are respectively weaker than those pertaining to the state s, the processing proceeds to Step S62. Furthermore, when at least one of the values $P_t(s')$, $P_f(s')$, and $P_m(s')$ of the magnitude of the pressure (torque) applied to the tool, the feed shaft, and the spindle, which pertain to the state s', is stronger than the corresponding one of those pertaining to the state s, the processing proceeds to Step S63.

At Step S62, the reward calculation unit 221 sets the reward $r_p$ to a negative value.

At Step S63, the reward calculation unit 221 sets the reward $r_p$ to a positive value.

At Step S64, the reward calculation unit 221 determines whether all the shapes $WF_t(s')$, $WF_f(s')$, and $WF_m(s')$ of waveforms of the pressure (torque) applied to the tool, the feed shaft, and the spindle, which are included in the determination information pertaining to the state s', are each similar to the waveform indicating a sign that the tool will break down or the waveform indicating a further decrease in the lifetime of the tool. When there is dissimilarity in all the shapes $WF_t(s')$, $WF_f(s')$, and $WF_m(s')$ of the waveforms of the pressure (torque) applied to the tool, the feed shaft, and the spindle, which pertain to the state s', the processing proceeds to Step S66. Furthermore, when there is similarity in at least one of the shapes $WF_t(s')$, $WF_f(s')$, and $WF_m(s')$ of the waveforms of the pressure (torque) applied to the tool, the feed shaft, and the spindle, which pertain to the state s', the processing proceeds to Step S65.

At Step S65, the reward calculation unit 221 sets the reward $r_w$ to a negative value.

At Step S66, the reward calculation unit 221 sets the reward $r_w$ to a positive value.

At Step S67, the reward calculation unit 221 determines whether the value T(s') of the period of time taken for the cutting work, which is included in the determination information pertaining to the state s', has increased or decreased compared to the value T(s) of the period of time taken for the cutting work, which is included in the determination information pertaining to the state s, or stays constant. In a case where the value T(s') of the period of time taken for the cutting work, which pertains to the state s', has increased above that pertaining to the state s, the processing proceeds to Step S68. Furthermore, in a case where the value T(s') of the period of time taken for the cutting work, which pertains to the state s', has decreased below that pertaining to the state s, the processing proceeds to Step S70. Furthermore, in a case where the value T(s') of the period of time taken for the cutting work, which pertains to the state s', stays constant, the processing proceeds to Step S69.

At Step S68, the reward calculation unit 221 sets the reward $r_c$ to a negative value.

At Step S69, the reward calculation unit 221 sets the reward $r_c$ to zero.

At Step S70, the reward calculation unit 221 sets the reward $r_c$ to a positive value.

At Step S71, the reward calculation unit 221 uses the calculated rewards $r_p$, $r_w$, and $r_c$ and Equation 2, and calculates a reward $r_{cycle}$ in the machining time priority mode and a reward $r_{tool}$ in the tool lifetime priority mode, respectively. The flow of the reward calculation processing ends. Then the processing proceeds to Step S17.

With the operation described above with reference to FIGS. 3 and 4, it is possible to generate, in the present embodiment, the value functions $Q_{cycle}$, $Q_{tool}$ used to optimize a fixed cycle for a machining program in a site of multi-product, variable quantity production, for example, without increasing the operator's workload.

Next, operation when generating optimum action information by the optimum action information output unit 205 will now be described herein with reference to the flowchart in FIG. 5.

At Step S21, the optimum action information output unit 205 acquires the value function $Q_{cycle}$ in the machining time priority mode and the value function $Q_{tool}$ in the tool lifetime priority mode, which the value function storage unit 204 stores.

At Step S22, the optimum action information output unit 205 generates pieces of optimum action information for the machining time priority mode and the tool lifetime priority mode, respectively, based on the acquired value function $Q_{cycle}$ and the acquired value function $Q_{tool}$, and outputs the generated pieces of optimum action information for the machining time priority mode and the tool lifetime priority mode to the numerical control device 101.

As described above, the numerical control device 101 executes a machining program in which a cutting amount for one time and a cutting rate, which are set for a fixed cycle, are updated in accordance with an action in the machining time priority mode or the tool lifetime priority mode, which is selected by the setting device 111, making it possible to optimize the machining program in a site of multi-product, variable quantity production, for example, without increasing the operator's workload. Thereby, the numerical control device 101 makes it possible to perform machining by prioritizing a period of time required for machining (i.e., cycle time) or to perform machining by prioritizing the lifetime of the tool.

Furthermore, the numerical control device 101 makes it possible to reduce the time and effort required to create a machining program, since the operator is not required to set arguments for a cutting amount for one time and a cutting rate.

The first embodiment has been described above.

Second Embodiment

Next, a second embodiment will now be described herein. In the second embodiment, a machine learning device 20A further includes, in addition to the functions according to the first embodiment, a function of, for a machining program including a plurality of (e.g., n number of) fixed cycles, such as two or more fixed cycles, stopping the machining program each time each of the fixed cycles (e.g., an i-th fixed cycle) is executed, calculating a state s(i), an action a(i), determination information (i), a reward r(i), and an action a'(i) with respect to a state s'(i), which pertain to the i-th fixed cycle, and updating a cutting amount for one time and a cutting rate for the i-th fixed cycle. Note that n represents an integer of 2 or greater, and i represents an integer ranging from 1 to n.

By doing so, it is possible to identify the cutting amount for one time and the cutting rate, which are set for the i-th fixed cycle, as an action for the i-th fixed cycle. The i-th fixed cycle is hereinafter also referred to as a "fixed cycle (i)" ($1 \leq i \leq n$).

The second embodiment will now be described below.

Figure 6:
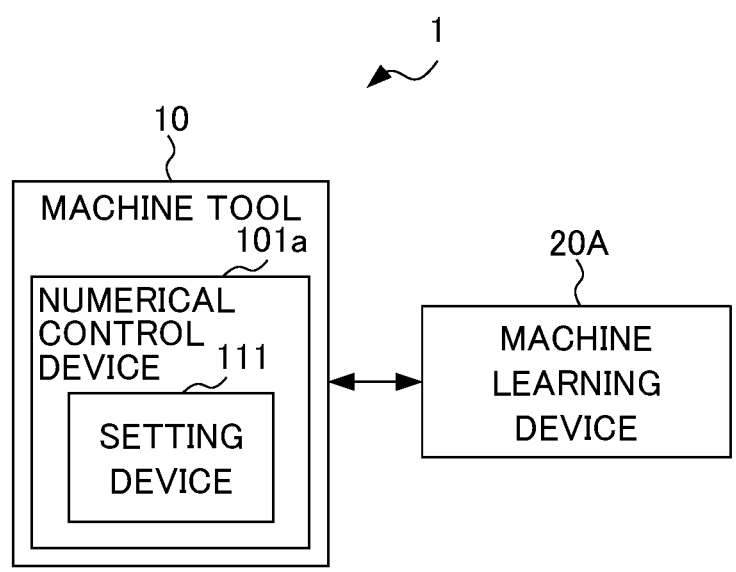
FIG. 6 is a functional block diagram illustrating a functional configuration example of a numerical control system according to a second embodiment.

FIG. 6 is a functional block diagram illustrating a functional configuration example of a numerical control system according to the second embodiment. Note that, for those elements having functions similar to those of the elements of the numerical control system 1 in FIG. 1, identical reference symbols are attached, and detailed descriptions are omitted.

As illustrated in FIG. 6, a numerical control system 1 according to the second embodiment includes a machine tool 10 and the machine learning device 20A.

The machine tool 10 is, similar to the case according to the first embodiment, a machine tool commonly known by those skilled in the art, and includes a numerical control device 101a. The machine tool 10 operates based on an operation command from the numerical control device 101a.

The numerical control device 101a is, similar to the case according to the first embodiment, a numerical control device commonly known by those skilled in the art, and is configured to generate an operation command based on a machining program acquired from an external device (not shown) such as devices for computer aided designing (CAD)/computer aided manufacturing (CAM), and to transmit the generated operation command to the machine tool 10. Thereby, the numerical control device 101a controls operation of the machine tool 10.

Note that the numerical control device 101a according to the second embodiment may, when executing a machining program, for example, stop the machining program each time each of the n number of fixed cycles (i) such as centering and tapping included in the machining program is completed, and output information pertaining to a tool and a workpiece set in the machine tool 10 for the fixed cycle, a cutting amount for one time and a cutting rate, which are set for the fixed cycle (i), and measured values acquired from the machine tool 10 by executing the machining program, to the machine learning device 20A.

Note that the setting device 111 has functions equivalent to those of the setting device 111 according to the first embodiment.

<Machine Learning Device 20A>

The machine learning device 20A is a device configured to perform, as the numerical control device 101a executes the machining program to cause the machine tool 10 to operate, reinforcement learning of a cutting amount for one time and a cutting rate per each of the n number of fixed cycles included in the machining program.

Figure 7:
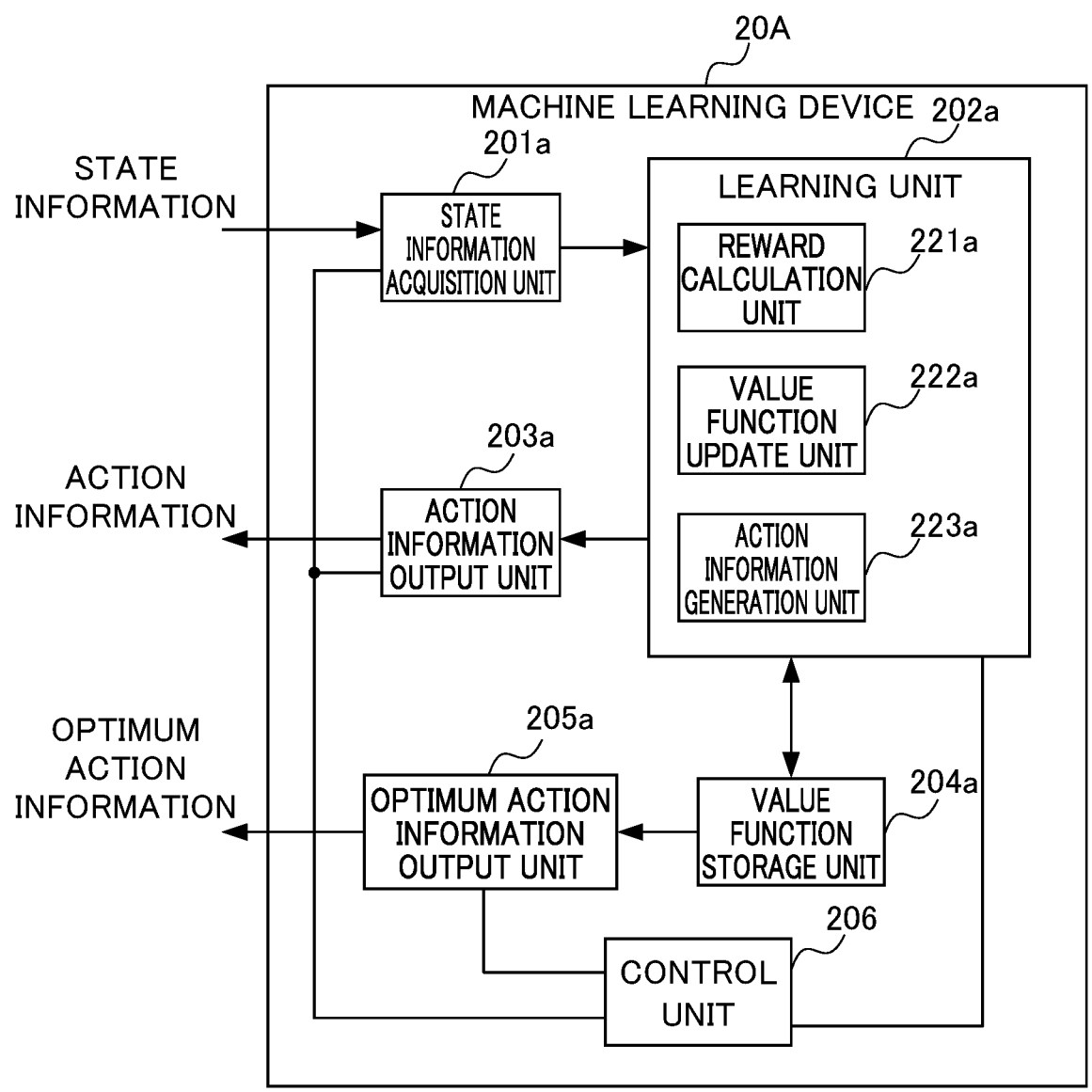
FIG. 7 is a functional block diagram illustrating a functional configuration example of a machine learning device.

FIG. 7 is a functional block diagram illustrating a functional configuration example of the machine learning device 20A.

As illustrated in FIG. 7, the machine learning device 20A includes a state information acquisition unit 201a, a learning unit 202a, an action information output unit 203a, a value function storage unit 204a, an optimum action information output unit 205a, and a control unit 206. The learning unit 202a includes a reward calculation unit 221a, a value function update unit 222a, and an action information generation unit 223a.

Note that the control unit 206 has functions equivalent to those of the control unit 206 according to the first embodiment.

The state information acquisition unit 201a is configured to acquire, each time each of the n number of fixed cycles included in the machining program is executed, as a state of the machine tool 10, state data s including information pertaining to the tool and the workpiece set in the machine tool 10, a cutting amount for one time and a cutting rate, which are set for the fixed cycle (i) ($1 \leq i \leq n$), and measured values acquired from the machine tool 10 by executing the machining program, from the numerical control device 101.

The state information acquisition unit 201a outputs the state data s(i) acquired per the fixed cycle (i) to the learning unit 202a.

Note that the state information acquisition unit 201a may store the state data s(i) acquired per the fixed cycle (i) in a storage unit (not shown) included in the machine learning device 20A. In this case, the learning unit 202a described later may read the state data s(i) per the fixed cycle (i) from the storage unit (not shown) of the machine learning device 20A.

Furthermore, the state information acquisition unit 201a acquires, per the fixed cycle (i), determination information used to calculate a reward for performing the Q-learning. Specifically, the magnitude of pressure applied to the tool (the axial direction and the rotation direction), the shape of a waveform of the pressure applied to the tool (the axial direction and the rotation direction), the magnitude of torque applied to the feed shaft, the shape of a waveform of the torque applied to the feed shaft, the magnitude of torque applied to the spindle, the shape of a waveform of the torque applied to the spindle, and the period of time taken for the cutting work when the fixed cycle (i) is executed, which are acquired from the machine tool 10 by executing the fixed cycle (i) included in the machining program pertaining to state information s(i), are regarded as determination information used to calculate a reward for performing the Q-learning.

The learning unit 202a is a part that performs learning of a value function Q(s(i), a(i)) when a certain action a(i) is selected under a certain state data (environment state) s(i) in the fixed cycle (i). Specifically, the learning unit 202a includes the reward calculation unit 221a, the value function update unit 222a, and the action information generation unit 223a.

Note that the learning unit 202a is configured to determine whether learning should be continued, similar to the learning unit 202 according to the first embodiment. It is possible to determine whether learning should be continued based on, for example, whether an attempt count for a machining program after starting the machine learning has reached the maximum attempt count or whether an elapsed period of time after starting the machine learning has exceeded (or is equal to or greater than) a predetermined period of time.

The reward calculation unit 221a is configured to calculate a reward when an action a(i) is selected under a certain state s(i) in the fixed cycle (i) based on the determination information pertaining to the fixed cycle (i). Note that a reward to be calculated for the fixed cycle (i) is calculated, similar to the case according to the first embodiment, based on the items of (1) magnitude of pressure (torque) applied to tool, feed shaft, and spindle, (2) shapes of waveforms of pressure (torque) applied to tool, feed shaft, and spindle, and (3) period of time taken for cutting work. That is, for example, rewards $r_p(i)$, $r_w(i)$, and $r_c(i)$ for items in the fixed cycle (i) are respectively calculated, similar to the rewards $r_p$, $r_w$, and $r_c$ according to the first embodiment.

The reward calculation unit 221a may then calculate, similar to the reward calculation unit 221 according to the first embodiment, a reward $r_{cycle}(i)$ in the machining time priority mode and a reward $r_{tool}(i)$ in the tool lifetime priority mode for the fixed cycle (i) by using the rewards $r_p(i)$, $r_w(i)$, and $r_c(i)$ for the items and Equation 2.

The value function update unit 222a is configured to perform, similar to the value function update unit 222 according to the first embodiment, in the case of the machine learning in the machining time priority mode, the Q-learning based on, in the fixed cycle (i), a state s(i), an action a(i), a state s'(i) when the action a(i) is applied to the state s(i), and the value of a reward $r_{cycle}(i)$ calculated as described above to update a value function $Q_{cycle\_i}$ for the fixed cycle (i), which the value function storage unit 204a stores. The value function update unit 222a is further configured to perform, in the case of the machine learning in the tool lifetime priority mode, the Q-learning based on, in the fixed cycle (i), the state s(i), the action a(i), the state s'(i) when the action a(i) is applied to the state s(i), and the value of the reward $r_{tool}(i)$ calculated as described above to update a value function $Q_{tool\_i}$ that the value function storage unit 204a stores.

The action information generation unit 223a is configured to select, similar to the action information generation unit 223 according to the first embodiment, for the present state s(i) in the fixed cycle (i), an action a(i) in the course of the Q-learning. The action information generation unit 223a generates action information a pertaining to the i-th fixed cycle to cause operation of modifying a cutting amount for one time and a cutting rate for the i-th fixed cycle (corresponding to the action a in the Q-learning), to be performed, in the course of the Q-learning in accordance with the machining time priority mode or the tool lifetime priority mode, and outputs the generated action information a pertaining to the i-th fixed cycle to the action information output unit 203a.

The action information output unit 203a is configured to output, similar to the action information output unit 203 according to the first embodiment, action information a(i) per the fixed cycle (i), which is outputted from the learning unit 202a, to the numerical control device 101a. The action information output unit 203a may output, as action information per a fixed cycle (i), for example, updated values of a cutting amount for one time and a cutting rate to the numerical control device 101a. Thereby, the numerical control device 101a updates the n number of fixed cycles (i) included in the machining program, respectively, based on the received, updated values of the cutting amount for one time and the cutting rate. The numerical control device 101a then generates an operation command based on the machining program including the updated fixed cycles (i), and causes the machine tool 10 to perform cutting work based on the generated operation command.

Note that the action information output unit 203a may output, as action information per the fixed cycle (i), a machining program in which the fixed cycle (i) is updated based on the updated values of a cutting amount for one time and a cutting rate to the numerical control device 101a.

The value function storage unit 204a is a storage device configured to store the value function $Q_{cycle\_i}$ in the machining time priority mode and the value function $Q_{tool\_i}$ in the tool lifetime priority mode per the fixed cycle (i). Note that a relationship between an aggregation of the value functions $Q_{cycle\_i}$ ($1 \leq i \leq n$) and the value function $Q_{cycle}$ and a relationship between an aggregation of the value functions $Q_{tool\_i}$ ($1 \leq i \leq n$) and the value function $Q_{tool}$ are represented by Equation 3.

$$Q_{cycle} = \bigcup_i Q_{cycle\_i}$$
$$Q_{tool} = \bigcup_i Q_{tool\_i}$$

[Equation 3]

The value functions $Q_{cycle\_i}$, $Q_{tool\_i}$ per the fixed cycle (i), which are stored in the value function storage unit 204a, are updated by the value function update unit 222.

The optimum action information output unit 205a is configured to generate, similar to the optimum action information output unit 205 according to the first embodiment, based on the value function $Q_{cycle}$ in the machining time priority mode or the value function $Q_{tool}$ in the tool lifetime priority mode, which are updated as the value function update unit 222a performs the Q-learning, action information (optimum action information) a pertaining to the fixed cycle (i), which causes the numerical control device 101a to perform operation according to which a value of a value function becomes maximum.

More specifically, the optimum action information output unit 205a acquires the value function $Q_{cycle}$ in the machining time priority mode and the value function $Q_{tool}$ in the tool lifetime priority mode, which the value function storage unit 204 stores. The optimum action information output unit 205a then generates action information pertaining to the fixed cycle (i) based on the acquired value function $Q_{cycle}$ in the machining time priority mode and action information pertaining to the fixed cycle (i) based on the acquired value function $Q_{tool}$ in the machining time priority mode, and outputs each of the generated pieces of action information pertaining to the fixed cycles (i) to the numerical control device 101a. The optimum action information includes, similar to the action information that the action information output unit 203a outputs in the course of the Q-learning, information indicative of updated values of a cutting amount for one time and a cutting rate.

The functional blocks included in the machine learning device 20A have been described above.

Next, operation of the machine learning device 20A when performing the Q-learning, according to the present embodiment, will now be described herein with reference to the flowchart in FIG. 8.

Figure 8:
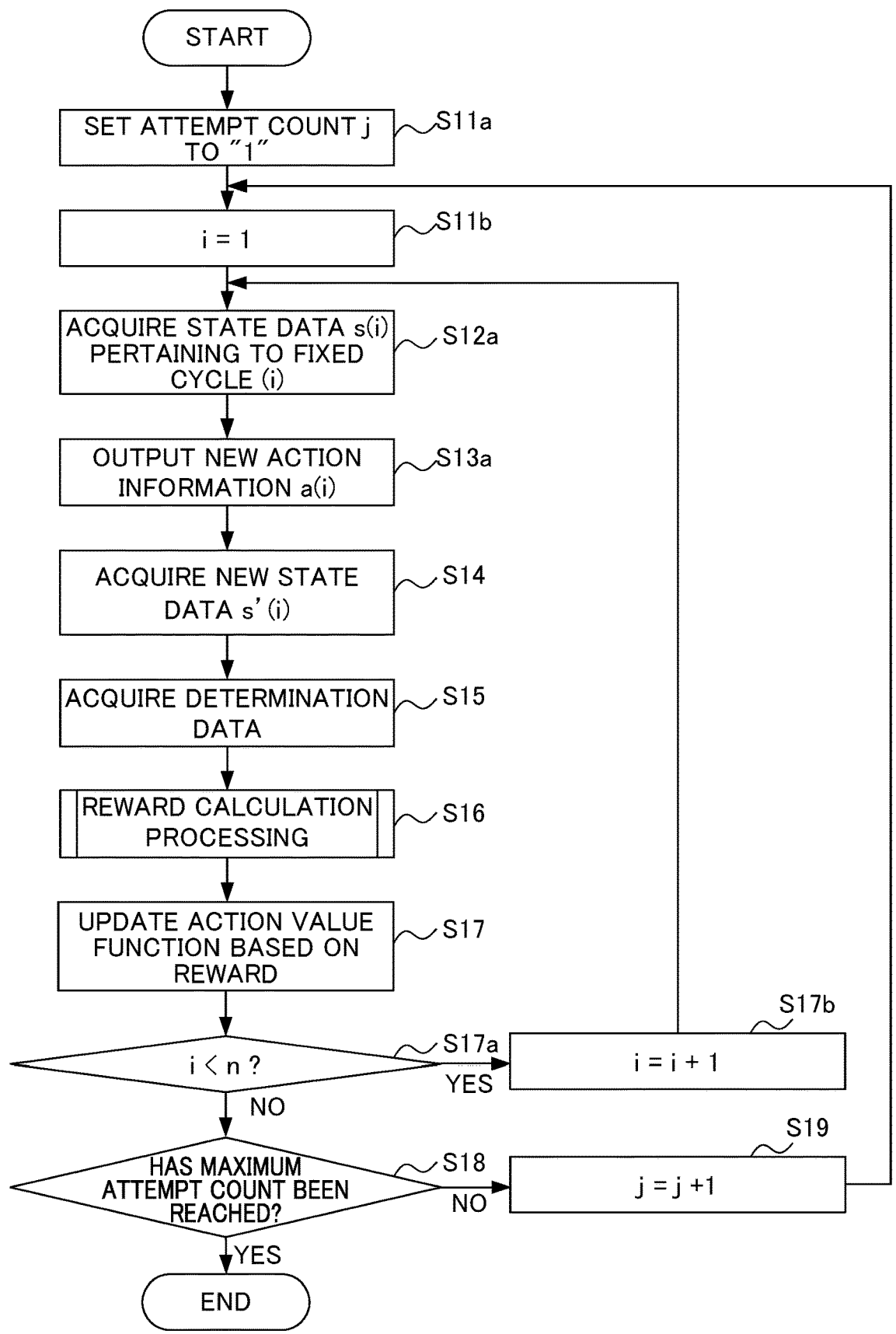
FIG. 8 is a flowchart illustrating operation of the machine learning device when performing Q-learning, according to the second embodiment.

FIG. 8 is a flowchart illustrating the operation of the machine learning device 20A when performing the Q-learning, according to the second embodiment. Note that, in the flowchart in FIG. 8, parts of processing similar to the steps illustrated in FIG. 3 are applied with identical step numbers, and detailed descriptions are omitted.

At Step S11a, the control unit 206 instructs the state information acquisition unit 201a to acquire state information indicative of an attempt count j set to initial setting of a machining program, i.e., "1".

At Step S11b, the control unit 206 initializes i to "1".

At Step S12a, the state information acquisition unit 201a acquires state data s(i) pertaining to a fixed cycle (i) from the numerical control device 101a. The acquired state data s(i) is outputted to the action information generation unit 223a. As described above, the state data (state information) s(i) is information corresponding to a state s(i) in the fixed cycle (i) in the Q-learning, and includes, at the point in time at Step S12a, a cutting amount for one time, a cutting rate, the material of a tool, the shape of the tool, the diameter of the tool, the length of the tool, the remaining lifetime of the tool, the material of a workpiece to be machined, the catalog cutting conditions for the tool, the rotation number of the spindle, motor current values, a machine temperature, and an ambient temperature. Note that the operator generates beforehand state data at a point in time of starting the Q-learning for the first time.

At Step S13a, the action information generation unit 223a generates, through the machine learning in the machining time priority mode or the tool lifetime priority mode, pieces of new action information a(i) pertaining to the fixed cycle (i) in the machining time priority mode and the tool lifetime priority mode, and outputs the generated pieces of new action information a(i) in the machining time priority mode and the tool lifetime priority mode to the numerical control device 101a via the action information output unit 203a. The numerical control device 101a executes, based on action information a(i) selected by the setting device 111 from among the received pieces of action information a(i) in the machining time priority mode and the tool lifetime priority mode, a machining program in which a cutting amount for one time and a cutting rate, which are set in the fixed cycle (i), are updated. The numerical control device 101a then generates an operation command based on the updated fixed cycle (i), and causes the machine tool 10 to perform cutting work based on the generated operation command. The numerical control device 101a then stops the machining program after the fixed cycle (i) is completed.

At Step S14, the state information acquisition unit 201a performs processing similar to that at Step S14 according to the first embodiment, and acquires new state data s'(i) pertaining to the fixed cycle (i), which is acquired from the numerical control device 101a.

At Step S15, the state information acquisition unit 201a performs processing similar to that at Step S15 according to the first embodiment, and acquires determination information about the new state s'(i) in the fixed cycle (i). The acquired determination information is outputted to the learning unit 202a.

At Step S16, the reward calculation unit 221a performs processing similar to that at Step S16 according to the first embodiment, performs the reward calculation processing in FIG. 4 based on the acquired determination information, and calculates a reward $r_{cycle}(i)$ for the fixed cycle (i) in the machining time priority mode and a reward $r_{tool}(i)$ for the fixed cycle (i) in the tool lifetime priority mode, respectively.

At Step S1$7$, the value function update unit 222a performs processing similar to that at Step S17 according to the first embodiment, and updates the value function $Q_{cycle\_i}$ in the machining time priority mode and the value function $Q_{tool\_i}$ in the tool lifetime priority mode, respectively, for the fixed cycle (i), which the value function storage unit 204a stores, based on the calculated reward $r_{cycle}(i)$ and the calculated reward $r_{tool}(i)$ for the fixed cycle (i).

At Step S17a, the control unit 206 determines whether i is smaller than n. When i is smaller than n, the processing proceeds to Step S17b. On the other hand, when i is equal to or greater than n, the processing proceeds to Step S18.

At Step S17b, the control unit 206 increases i by "1". The processing returns to Step S12a.

At Step S18, the control unit 206 performs processing similar to that at Step S18 according to the first embodiment, and determines whether the attempt count j pertaining to the machining program after starting the machine learning has reached the maximum attempt count. When the maximum attempt count has not yet been reached, the attempt count j is counted up by "1" at Step S19. Then the processing returns to Step S11b. The processing from Steps S11b to S19 is repeatedly performed until the maximum attempt count has been reached.

Note that, although, in the flow in FIG. 8, the processing ends when the attempt count j pertaining to the machining program reaches the maximum attempt count, the processing may end when such a condition pertaining to a period of time taken for the processing from Steps S11b to S19 is satisfied that a cumulative period of time after starting the machine learning exceeds (or, is equal to or greater than) a maximum elapsed period of time set beforehand.

Furthermore, although Step S17 has exemplified online updating, the updating method may be replaced with batch updating or mini-batch updating, instead of the online updating.

With the operation described above with reference to FIG. 8, it is possible to generate, in the present embodiment, the value functions $Q_{cycle}$, $Q_{tool}$ used to optimize a fixed cycle for a machining program in a site of multi-product, variable quantity production, for example, without increasing the operator's workload.

Figure 5:
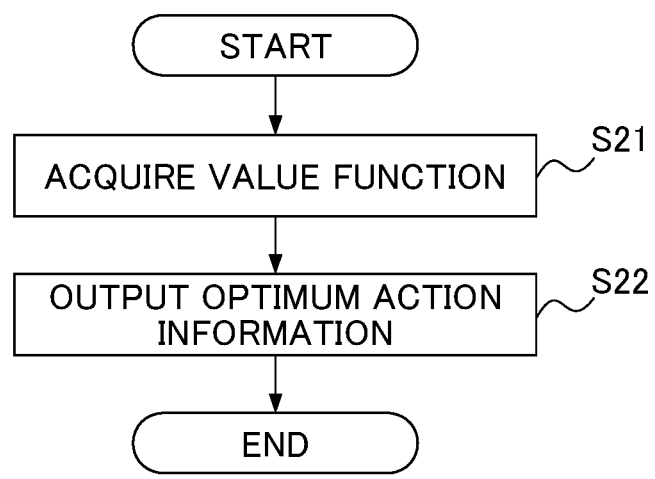
FIG. 5 is a flowchart illustrating operation when generating optimum action information by an optimum action information output unit.

Note that, since operation when generating optimum action information by the optimum action information output unit 205a is similar to that illustrated in the flowchart in FIG. 5, excluding how to generate optimum action information per a fixed cycle (i), its description is omitted.

As described above, the numerical control device 101a executes a machining program in which a cutting amount for one time and a cutting rate, which are set for a fixed cycle (i), are updated in accordance with an action in the machining time priority mode or the tool lifetime priority mode per the fixed cycle (i), which is selected by the setting device 111, making it possible to optimize the machining program in a site of multi-product, variable quantity production, for example, without increasing the operator's workload. Thereby, the numerical control device 101 makes it possible to perform machining by prioritizing a period of time required for machining (i.e., cycle time) or to perform machining by prioritizing the lifetime of a tool.

Furthermore, the numerical control device 101*a* makes it possible to reduce the time and effort required to create a machining program, since the operator is not required to set arguments for a cutting amount for one time and a cutting rate.

The second embodiment has been described above.

Although the first embodiment and the second embodiment have been described above, the numerical control devices 101, 101*a* and the machine learning devices 20, 20A are not limited to those according to the embodiments described above, but include modifications and improvements that fall within the scope of the present invention, as long as it is possible to achieve the object of the present invention.

Modification Example 1

In the first embodiment and the second embodiment described above, the machine learning devices 20, 20A alternately perform the machine learning in the machining time priority mode and the tool lifetime priority mode. However, the present invention is not limited to the embodiments. For example, the machine learning devices 20, 20A may separately perform the machine learning in the machining time priority mode and the machine learning in the tool lifetime priority mode.

Modification Example 2

Furthermore, for example, in the first embodiment and the second embodiment described above, the setting device 111 selects an action in the machining time priority mode or an action in the tool lifetime priority mode based on a comparison of the remaining tool lifetime of a tool being used in the machine tool 10 with a threshold value that is set beforehand. However, the present invention is not limited to the embodiments.

For example, when the remaining tool lifetime of a tool is 5%, the number of remaining parts to be machined is three, and a rate of decrease in the lifetime of the tool per one cycle of machining is 0.1%, the remaining lifetime of the tool after the three remaining parts to be machined, i.e., workpieces, are processed is not 0%, but is 4.7%. In this case, the setting device 111 may select an action in the machining time priority mode when the remaining lifetime of the tool does not reach 0% after the remaining parts to be machined, i.e., the workpieces, are processed, even when the remaining lifetime of the tool is equal to or less than a threshold value.

Thereby, even when the remaining lifetime of a tool is shorter, but the remaining lifetime of the tool is enough for machining remaining parts to be machined, it is possible to continue machining without reducing the period of time required for machining (cycle time).

Modification Example 3

Furthermore, for example, although, in the first embodiment and the second embodiment described above, the machine learning devices 20, 20A have been exemplified as devices that are separate from the numerical control devices 101, 101*a*, the numerical control devices 101, 101*a* may include some or all of the functions of the machine learning devices 20, 20A.

Otherwise, for example, a server may include some or all of the state information acquisition unit 201, the learning unit 202, the action information output unit 203, the value function storage unit 204, the optimum action information output unit 205, and the control unit 206 of the machine learning device 20 or some or all of the state information acquisition unit 201*a*, the learning unit 202*a*, the action information output unit 203*a*, the value function storage unit 204*a*, the optimum action information output unit 205*a*, and the control unit 206 of the machine learning device 20A. Furthermore, for example, a virtual server function that is available on a cloud may be utilized to achieve the functions of the machine learning devices 20, 20A.

Furthermore, the machine learning devices 20, 20A may each be a distributed processing system in which the functions of each of the machine learning devices 20, 20A are appropriately distributed among a plurality of servers.

Modification Example 4

Figure 9:
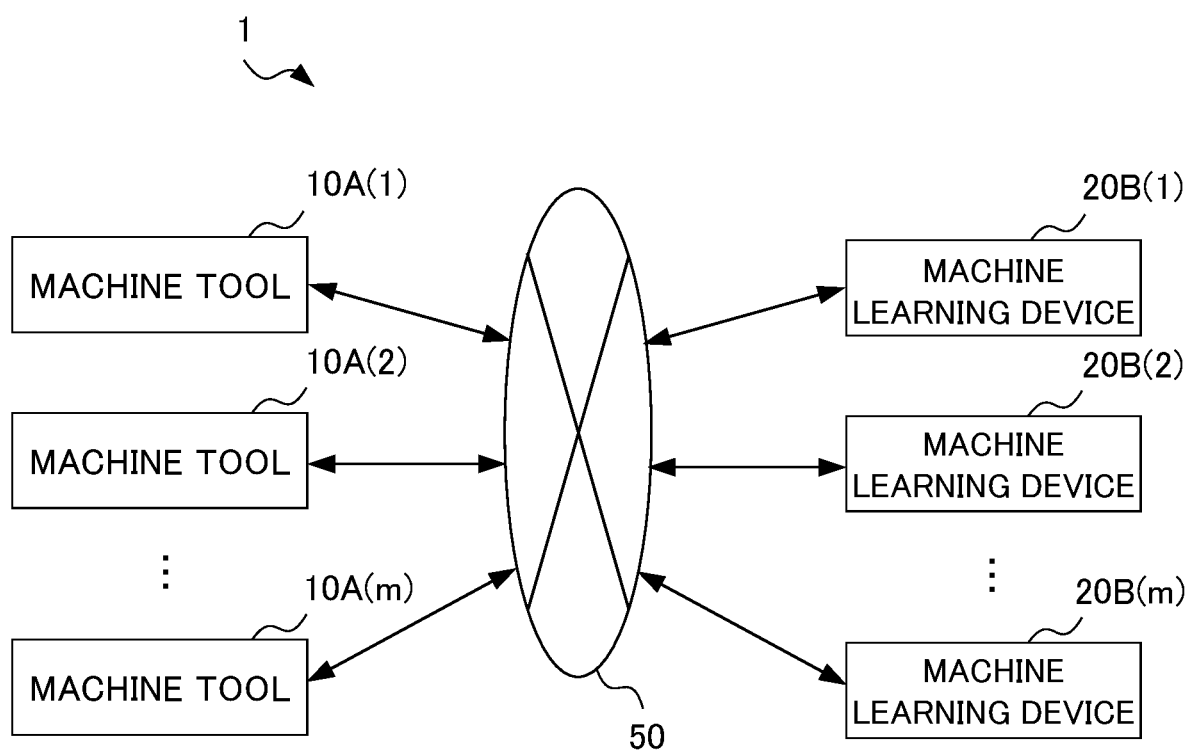
FIG. 9 is a view illustrating an example of a configuration of a numerical control system.

Furthermore, for example, in the first embodiment and the second embodiment described above, the single machine tool 10 and single one of the machine learning devices 20, 20A have been communicably coupled to each other in the control system 1. However, the present invention is not limited to the embodiments. For example, as illustrated in FIG. 9, the control system 1 may include the m number of machine tools 10A(1) to 10A(m) and the m number of machine learning devices 20B(1) to 20B(m) (m is an integer of 2 or greater). In this case, the machine learning device 20B(j) may be communicably coupled to the machine tool 10A(j) via a network 50 in a one-on-one manner to perform machine learning with respect to the machine tool 10A(j) (j is an integer ranging from 1 to m).

Note that the value functions $Q_{cycle}$, $Q_{tool}$ ($Q_{cycle\_i}$, and $Q_{tool\_i}$) stored in the value function storage unit 204 (204*a*) of the machine learning device 20B(j) may be shared with another machine learning device, such as the machine learning device 20B(k) (k is an integer ranging from 1 to m, k≠j). By allowing the value functions $Q_{cycle}$, $Q_{tool}$ ($Q_{cycle\_i}$, $Q_{tool\_i}$) to be shared among the machine learning devices 20B(1) to 20B(m), it is possible to perform reinforcement learning in a distributed manner among the machine learning devices 20B, improving the efficiency of reinforcement learning.

Note that the machine tools 10A(1) to 10A(m) each correspond to the machine tool 10 in FIG. 1 or 6. Furthermore, the machine learning devices 20B(1) to 20B(m) each correspond to the machine learning device 20 in FIG. 1 or the machine learning device 20A in FIG. 6.

Figure 10:
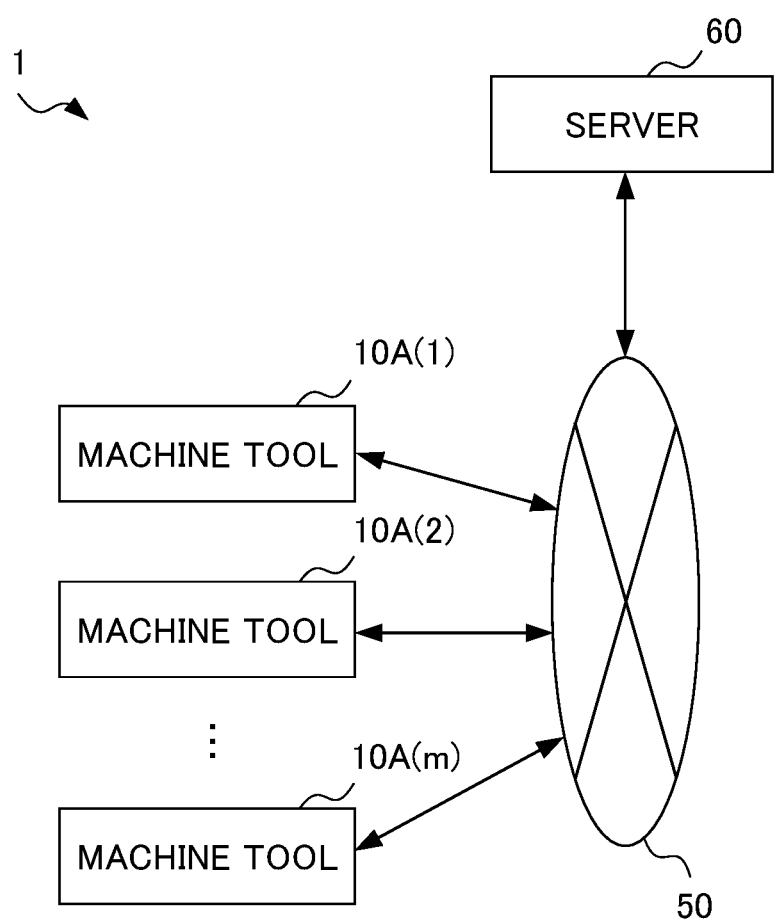
FIG. 10 is a view illustrating an example of a configuration of a numerical control system.

Furthermore, as illustrated in FIG. 10, a server 60 may operate as the machine learning device 20 (20A), and may be communicably coupled to the m number of machine tools 10A(1) to 10A(m) via the network 50 to perform machine learning with respect to each of the machine tools 10A(1) to 10A(m).

Note that it is possible to each achieve the functions included in the numerical control devices 101, 101*a* and the machine learning devices 20, 20A in the first embodiment and the second embodiment, respectively, through hardware, software, or a combination thereof. In here, achievement through software means achievement when a computer reads and executes a program.

It is possible to each achieve the components included in the numerical control devices 101, 101*a* and the machine learning devices 20, 20A through hardware including electric circuits and other circuits, software, or a combination thereof. When it is achieved through software, programs configuring the software are installed into a computer. Furthermore, the programs may be recorded in a removable medium and distributed to a user, or may be downloaded into and distributed to a computer of a user via a network. Furthermore, when it is configured through hardware, it is possible to configure some or all of the functions of the components included in the devices described above with, for example, integrated circuits (ICs) such as application specific integrated circuits (ASICs), gate arrays, field programmable gate arrays (FPGAs), and complex programmable logic devices (CPLDs).

It is possible to use a non-transitory computer readable medium that varies in type to store the programs, and to supply the programs to a computer. Examples of the non-transitory computer readable medium include tangible storage media that vary in type. Examples of the non-transitory computer readable medium include magnetic recording media (e.g., flexible disks, electromagnetic tape, and hard disk drives), magneto-optical recording media (e.g., magneto-optical discs), compact disc read only memories (CD-ROMs), compact disc-recordables (CD-Rs), compact disc-rewritables (CD-R/Ws), and semiconductor memories (e.g., mask ROMs, programmable ROMs (PROMs), erasable PROMs (EPROMs), flash ROMs, and random access memories (RAMs)). Furthermore, the programs may be supplied to the computer via a transitory computer readable medium that varies in type. Examples of the transitory computer readable medium include electric signals, optical signals, and electromagnetic waves. A transitory computer readable medium is able to supply the programs to the computer via wired communication channels such as electric wires and optical fibers or wireless communication channels.

Note that steps for describing programs to be recorded in a recording medium include not only processes sequentially executed in a chronological order, but also processes that may not necessarily be executed in a chronological order, but may be executed in parallel or separately.

In other words, it is possible that the machine learning device, the setting device, the numerical control system, the numerical control device, and the machine learning method according to the present disclosure take various types of embodiments having configurations described below.

(1) The machine learning device 20 according to the present disclosure is a machine learning device configured to perform machine learning with respect to the numerical control device 101 configured to cause the machine tool 10 to operate based on a machining program. The machine learning device 20 includes: the state information acquisition unit 201 configured to acquire, as the numerical control device 101 executes the machining program set with at least a cutting amount for one time and a cutting rate and causes the machine tool 10 to perform the cutting work, state information including the cutting amount for one time and the cutting rate; the action information output unit 203 configured to output action information including adjustment information for the cutting amount for one time and the cutting rate included in the state information; the reward calculation unit 221 configured to acquire determination information that is information regarding at least the magnitude of pressure applied to a tool during the cutting work, the shape of a waveform of the pressure applied to the tool, and a period of time taken for the cutting work, and, based on the determination information that has been acquired, to output a reward value used in reinforcement learning depending on a predetermined condition; and the value function update unit 222 configured to update the value function Q based on the reward value, the state information, and the action information.

With the machine learning device 20, it is possible to optimize a machining program without increasing the operator's workload.

(2) In the machine learning device 20 described in (1), the predetermined condition may be either of a condition for prioritizing machining time and a condition for prioritizing lifetime of the tool, the reward calculation unit 221 may output a reward $r_{cycle}$ under the condition for prioritizing machining time and output a reward $r_{tool}$ under the condition for prioritizing the lifetime of the tool, and the value function update unit 222 may update the value function $Q_{cycle}$ based on the reward $r_{cycle}$, the state information, and the action information under the condition for prioritizing machining time and may update the value function $Q_{tool}$ based on the reward $r_{tool}$, the state information, and the action information under the condition for prioritizing the lifetime of the tool.

By doing so, it is possible to generate the value functions $Q_{cycle}$, $Q_{tool}$ used to optimize a fixed cycle for a machining program without increasing the operator's workload.

(3) In the machine learning devices 20, 20A described in (2), the machine learning may be performed each time the machining program is executed or each time each of a plurality of fixed cycles included in the machining program is executed.

By doing so, it is possible to optimize a machining program per machining of one workpiece or per fixed cycle.

(4) In the machine learning devices 20, 20A described in (2) or (3), the optimum action information output units 205, 205*a* each configured to output action information according to which a value of the value function $Q_{cycle}$ updated based on the reward $r_{cycle}$ becomes maximum and action information according to which a value of the value function $Q_{tool}$ updated based on the reward $r_{tool}$ becomes maximum may be further included.

By doing so, the machine learning devices 20, 20A make it possible to optimize a machining program in accordance with the state of a tool.

(5) In the machine learning device 20 described in (1), the reward calculation unit 221 may set the rewards $r_{cyce}$, $r_{tool}$ to positive values when the period of time taken for the cutting work, which is included in the determination information, becomes shorter than a period of time taken for previous cutting work and set the rewards $r_{cycle}$, $r_{tool}$ to negative values when the period of time taken for the cutting work becomes longer than the period of time taken for the previous cutting work.

By doing so, the machine learning device 20 makes it possible to optimize a machining program in accordance with a period of time taken for cutting work.

(6) In the machine learning device 20 described in (1), the reward calculation unit 221 may set the rewards $r_{cycle}$, $r_{tool}$ to positive values when the shape of the waveform of the pressure applied to the tool, which is included in the determination information, is dissimilar to at least the shape of a waveform, which indicates a sign that the tool will break down, and the shape of a waveform, which indicates a sharp decrease in the lifetime of the tool, and set the rewards $r_{cycle}$, $r_{tool}$ to negative values when the shape of the waveform of the pressure applied to the tool is similar to at least the shape of the waveform, which indicates the sign that the tool will break down, or the shape of the waveform, which indicates a sharp decrease in the lifetime of the tool.

By doing so, the machine learning device 20 makes it possible to optimize a machining program while taking into account the safeness of machining.

(7) In the machine learning devices 20, 20A described in any one of (1) to (6), a maximum attempt count for the machine learning may be provided to perform the machine learning.

By doing so, the machine learning devices 20, 20A make it possible to avoid such an event that the machine learning is performed for an extended period of time.

(8) The setting device 111 according to the present disclosure is configured to select an action based on a threshold value that is set beforehand from among actions acquired from the machine learning device described in any one of (1) to (7), and set the action that is selected into the machining program.

With the setting device 111, it is possible to achieve effects similar to those according to (1) to (7).

(9) The numerical control system 1 according to the present disclosure includes one of the machine learning devices 20, 20A described in any one of (1) to (7), the setting device 111 described in (8), and one of the numerical control devices 101, 101a configured to execute the machining program set by the setting device 111.

With the numerical control system 1, it is possible to achieve effects similar to those according to (1) to (7).

(10) The numerical control devices 101, 101a according to the present disclosure each include one of the machine learning devices 20, 20A described in any one of (1) to (7) and the setting device 111 described in (8), and are each configured to execute the machining program set by the setting device 111.

With the numerical control devices 101, 101a, it is possible to achieve effects similar to those according to (1) to (7).

(11) The numerical control method according to the present disclosure is a machine learning method for each of the machine learning devices 20, 20A each configured to perform machine learning with respect to one of the numerical control devices 101, 101a each configured to cause the machine tool 10 to operate based on a machining program. The numerical control method includes: acquiring, as the numerical control devices 101, 101a each execute the machining program set with at least a cutting amount for one time and a cutting rate and causes the machine tool 10 to perform the cutting work, state information including the cutting amount for one time and the cutting rate; outputting action information including adjustment information for the cutting amount for one time and the cutting rate included in the state information; acquiring determination information that is information regarding at least the magnitude of pressure applied to a tool during the cutting work, the shape of a waveform of the pressure applied to the tool, and the period of time taken for the cutting work and, based on the determination information that has been acquired, outputting a reward value used in reinforcement learning depending on a predetermined condition; and updating the value function Q based on the reward value, the state information, and the action information.

With the numerical control method, it is possible to achieve effects similar to those according to (1).

EXPLANATION OF REFERENCE NUMERALS

1 Numerical control system
10 Machine tool
101, 101a Numerical control device
111 Setting device
20, 20A Machine learning device
201, 201a State information acquisition unit
202, 202a Learning unit
221, 221a Reward calculation unit
222, 222a Value function update unit
223, 223a Action information generation unit
203, 203a Action information output unit
204, 204a Value function storage unit
205, 205a Optimum action information output unit
206 Control unit

The invention claimed is:

1. A machine learning device configured to perform machine learning with respect to a numerical control device configured to cause a machine tool to operate based on a machining program, the machine learning device comprising:
a memory that stores program; and
a processor configured to execute the program and control the machine learning device to:
acquire, as the numerical control device executes the machining program set with at least a cutting amount for one time and a cutting rate and causes the machine tool to perform cutting work, state information including the cutting amount for one time and the cutting rate;
output action information including adjustment information for the cutting amount for one time and the cutting rate included in the state information;
acquire determination information that is information regarding at least a magnitude of pressure applied to a tool during the cutting work, a shape of a waveform of the pressure applied to the tool, and a period of time taken for the cutting work, and, based on the determination information that has been acquired, to output a reward value used in reinforcement learning depending on a predetermined condition; and
update a value function based on the reward value, the state information, and the action information,
wherein the predetermined condition is either of a condition for prioritizing machining time and a condition for prioritizing lifetime of the tool,
the processor outputs a first reward value under the condition for prioritizing machining time and outputs a second reward value under the condition for prioritizing the lifetime of the tool, and
the processor updates a first value function based on the first reward value, the state information, and the action information under the condition for prioritizing machining time and updates a second value function based on the second reward value, the state information, and the action information under the condition for prioritizing the lifetime of the tool.

2. The machine learning device according to claim 1, wherein the machine learning is performed each time the machining program is executed or each time each of a plurality of fixed cycles included in the machining program is executed.

3. The machine learning device according to claim 1, wherein the processor outputs first action information according to which a value of the first value function updated based on the first reward value becomes maximum and second action information according to which a value of the second value function updated based on the second reward value becomes maximum.

4. The machine learning device according to claim 1, wherein the processor sets the reward value to a positive value when the period of time taken for the cutting work, the period of time being included in the determination information, becomes shorter than a period of time taken for previous cutting work and sets the reward value to a negative value when the period of time taken for the cutting work becomes longer than the period of time taken for the previous cutting work.

5. The machine learning device according to claim 1, wherein the processor sets the reward value to a positive value when the shape of the waveform of the pressure applied to the tool, the shape being included in the determination information, is dissimilar to at least a shape of a waveform, the shape indicating a sign that the tool will break down, and a shape of a waveform, the shape indicating a sharp decrease in the lifetime of the tool, and sets the reward value to a negative value when the shape of the waveform of the pressure applied to the tool is similar to at least the shape of the waveform, the shape indicating the sign that the tool will break down, or the shape of the waveform, the shape indicating a sharp decrease in the lifetime of the tool.

6. The machine learning device according to claim 1, wherein a maximum attempt count for the machine learning is set to perform the machine learning.

7. A setting device configured to
select an action based on a threshold value that is set beforehand from among actions acquired from a machine learning device, and
set the action that is selected into a machining program, wherein the machine learning device is configured to perform machine learning with respect to a numerical control device configured to cause a machine tool to operate based on the machining program, the machine learning device comprising:
a memory that stores program; and
a processor configured to execute the program and control the machine learning device to:
acquire, as the numerical control device executes the machining program set with at least a cutting amount for one time and a cutting rate and causes the machine tool to perform cutting work, state information including the cutting amount for one time and the cutting rate;
output action information including adjustment information for the cutting amount for one time and the cutting rate included in the state information;
acquire determination information that is information regarding at least a magnitude of pressure applied to a tool during the cutting work, a shape of a waveform of the pressure applied to the tool, and a period of time taken for the cutting work, and, based on the determination information that has been acquired, to output a reward value used in reinforcement learning depending on a predetermined condition; and
update a value function based on the reward value, the state information, and the action information,
wherein the predetermined condition is either of a condition for prioritizing machining time and a condition for prioritizing lifetime of the tool,
the processor outputs a first reward value under the condition for prioritizing machining time and outputs a second reward value under the condition for prioritizing the lifetime of the tool, and
the processor updates a first value function based on the first reward value, the state information, and the action information under the condition for prioritizing machining time and updates a second value function based on the second reward value, the state information, and the action information under the condition for prioritizing the lifetime of the tool.

8. A numerical control system comprising:
a machine learning device;
a setting device; and
a numerical control device configured to execute a machining program set by the setting device,
wherein the machine learning device comprises:
a memory that stores program; and
a processor configured to execute the program and control the machine learning device to:
acquire, as the numerical control device executes the machining program set with at least a cutting amount for one time and a cutting rate and causes the machine tool to perform cutting work, state information including the cutting amount for one time and the cutting rate;
output action information including adjustment information for the cutting amount for one time and the cutting rate included in the state information;
acquire determination information that is information regarding at least a magnitude of pressure applied to a tool during the cutting work, a shape of a waveform of the pressure applied to the tool, and a period of time taken for the cutting work, and, based on the determination information that has been acquired, to output a reward value used in reinforcement learning depending on a predetermined condition; and
update a value function based on the reward value, the state information, and the action information,
wherein the predetermined condition is either of a condition for prioritizing machining time and a condition for prioritizing lifetime of the tool,
the processor outputs a first reward value under the condition for prioritizing machining time and outputs a second reward value under the condition for prioritizing the lifetime of the tool, and
the processor updates a first value function based on the first reward value, the state information, and the action information under the condition for prioritizing machining time and updates a second value function based on the second reward value, the state information, and the action information under the condition for prioritizing the lifetime of the tool.

9. A numerical control device comprising:
a machine learning device; and
a setting device,
a numerical control device being configured to execute a machining program set by the setting device,
wherein the machine learning device comprises:
a memory that stores program; and
a processor configured to execute the program and control the machine learning device to:
acquire, as the numerical control device executes the machining program set with at least a cutting amount for one time and a cutting rate and causes the machine tool to perform cutting work, state information including the cutting amount for one time and the cutting rate;
output action information including adjustment information for the cutting amount for one time and the cutting rate included in the state information;
acquire determination information that is information regarding at least a magnitude of pressure applied to a tool during the cutting work, a shape of a waveform of the pressure applied to the tool, and a period of time taken for the cutting work, and, based on the determination information that has been acquired, to output a reward value used in reinforcement learning depending on a predetermined condition; and
update a value function based on the reward value, the state information, and the action information,
wherein the predetermined condition is either of a condition for prioritizing machining time and a condition for prioritizing lifetime of the tool,
the processor outputs a first reward value under the condition for prioritizing machining time and outputs a second reward value under the condition for prioritizing the lifetime of the tool, and
the processor updates a first value function based on the first reward value, the state information, and the action information under the condition for prioritizing machining time and updates a second value function based on the second reward value, the state information, and the action information under the condition for prioritizing the lifetime of the tool.

10. A machine learning method for a machine learning device configured to perform machine learning with respect to a numerical control device configured to cause a machine tool to operate based on a machining program, the machine learning device comprising a memory that stores program and a processor configured to execute the program and perform the machine learning method comprising:
  acquiring, as the numerical control device executes the machining program set with at least a cutting amount for one time and a cutting rate and causes the machine tool to perform cutting work, state information including the cutting amount for one time and the cutting rate;
  outputting action information including adjustment information for the cutting amount for one time and the cutting rate included in the state information;
  acquiring determination information that is information regarding at least a magnitude of pressure applied to a tool during the cutting work, a shape of a waveform of the pressure applied to the tool, and a period of time taken for the cutting work and, based on the determination information that has been acquired, outputting a reward value used in reinforcement learning depending on a predetermined condition; and
  updating a value function based on the reward value, the state information, and the action information,
  wherein the predetermined condition is either of a condition for prioritizing machining time and a condition for prioritizing lifetime of the tool,
  the processor outputs a first reward value under the condition for prioritizing machining time and outputs a second reward value under the condition for prioritizing the lifetime of the tool, and
  the processor updates a first value function based on the first reward value, the state information, and the action information under the condition for prioritizing machining time and updates a second value function based on the second reward value, the state information, and the action information under the condition for prioritizing the lifetime of the tool.

* * * * *